United States Patent
Fukuoka et al.

(10) Patent No.: US 11,555,926 B2
(45) Date of Patent: Jan. 17, 2023

(54) OPTICAL DEVICE, MEASUREMENT DEVICE, ROBOT, ELECTRONIC APPARATUS, MOBILE OBJECT, AND SHAPING DEVICE

(71) Applicant: Ricoh Company, Ltd., Tokyo (JP)

(72) Inventors: Naoki Fukuoka, Osaka (JP); Yoshihiko Miki, Kyoto (JP); Kazuhiro Yoneda, Osaka (JP); Toshiyuki Ikeoh, Miyagi (JP)

(73) Assignee: RICOH COMPANY, LTD., Tokyo (JP)

( * ) Notice: Subject to any disclaimer, the term of this patent is extended or adjusted under 35 U.S.C. 154(b) by 695 days.

(21) Appl. No.: 16/540,189

(22) Filed: Aug. 14, 2019

(65) Prior Publication Data

US 2020/0064480 A1 Feb. 27, 2020

(30) Foreign Application Priority Data

Aug. 27, 2018 (JP) .............................. JP2018-158796

(51) Int. Cl.
| | | |
|---|---|---|
| *G01S 17/89* | (2020.01) | |
| *G02B 26/08* | (2006.01) | |
| *G01S 7/481* | (2006.01) | |
| *G02B 3/00* | (2006.01) | |
| *G02B 27/48* | (2006.01) | |

(Continued)

(52) U.S. Cl.
CPC ............ *G01S 17/89* (2013.01); *G01S 7/4817* (2013.01); *G02B 3/0006* (2013.01); *G02B 26/0833* (2013.01); *G02B 26/10* (2013.01); *G02B 27/48* (2013.01); *B25J 15/0019* (2013.01)

(58) Field of Classification Search
CPC ...... G01S 17/89; G01S 7/4817; G01S 7/4185; G02B 26/0833; G02B 26/105; B25J 19/021; B25J 19/022
See application file for complete search history.

(56) References Cited

U.S. PATENT DOCUMENTS

2007/0147065 A1 6/2007 Nagata
2017/0234679 A1* 8/2017 Raz ..................... G01B 11/2513
359/558

(Continued)

FOREIGN PATENT DOCUMENTS

JP 2000-147604 A 5/2000
JP 2002-296514 10/2002

(Continued)

OTHER PUBLICATIONS

Japanese Office Action dated Apr. 19, 2022, in Japanese patent application No. 2018-158796.

*Primary Examiner* — Ryan D Howard
(74) *Attorney, Agent, or Firm* — Xsensus LLP

(57) ABSTRACT

An optical device according to an embodiment of the present disclosure includes a light source in which a plurality of light emitting elements are arranged at a predetermined distance, an optical system configured to convert light beams from the plurality of light emitting elements into line light beams, and a light deflection element configured to deflect each of the line light beams. Each of the line light beams is caused to be incident on the light deflection element such that a longitudinal direction of each of the light beams is aligned with a direction of a rotating axis of the light deflection element.

19 Claims, 19 Drawing Sheets

(51) Int. Cl.
*G02B 26/10* (2006.01)
*B25J 15/00* (2006.01)

(56) References Cited

U.S. PATENT DOCUMENTS

| | | | | |
|---|---|---|---|---|
| 2018/0304661 A1* | 10/2018 | Brown | .................... | B41M 5/24 |
| 2019/0025409 A1* | 1/2019 | Kawazoe | .............. | G01S 7/4817 |
| 2019/0091870 A1* | 3/2019 | Hino | ...................... | B25J 9/1666 |
| 2020/0106769 A1* | 4/2020 | Ramian | ................ | H04L 63/105 |

FOREIGN PATENT DOCUMENTS

| | | |
|---|---|---|
| JP | 2006-138926 | 6/2006 |
| JP | 2007-178727 A | 5/2007 |
| JP | 2009-146941 | 7/2009 |
| JP | 2015-524050 | 8/2015 |
| JP | 2016-217833 | 12/2016 |
| JP | 2017-532533 | 11/2017 |
| JP | 2018-146521 | 9/2018 |
| WO | WO2013/171613 A1 | 11/2013 |
| WO | WO2014/083485 A1 | 6/2014 |
| WO | WO2016/024273 A1 | 2/2016 |

* cited by examiner

SPECKLE IMAGE

LASER IRRADIATION ANGLE AND SPECKLE CONTRAST CHANGE

OPTICAL DEVICE, MEASUREMENT DEVICE, ROBOT, ELECTRONIC APPARATUS, MOBILE OBJECT, AND SHAPING DEVICE

CROSS-REFERENCE TO RELATED APPLICATIONS

This patent application is based on and claims priority pursuant to 35 U.S.C. § 119(a) to Japanese Patent Application No. 2018-158796, filed on Aug. 27, 2018, in the Japan Patent Office, the entire disclosure of which is hereby incorporated by reference herein.

BACKGROUND

Technical Field

Embodiments of the present disclosure relate to an optical device, a measurement device, a robot, an electronic apparatus, a mobile object, and a shaping device.

Description of the Related Art

In recent years, so-called projector-camera systems capable of performing area (surface) measurement have attracted attention. In three-dimensional measurement by such projector-camera systems, for example, a projector (a projection device) projects pattern light onto an object to be measured, the pattern light projected onto the object to be measured is captured by a camera (an imaging device), and a three-dimensional shape is reproduced from the captured image. In this way, the object to be measured is three-dimensionally measured.

However, when coherent light such as light from laser diode (LD) is used as light from the light source of a projection optical system in conventional three-dimensional measurement, an image including a speckle pattern is observed from a target onto which light is projected. In analyzing brightness information from the captured image, the speckle pattern becomes a noise, which may generate an error in analysis results and degrade measurement accuracy.

SUMMARY

In order to solve such issues described above and achieve the object, in one aspect, an optical device includes a light source in which a plurality of light emitting elements are arranged at a predetermined distance, an optical system configured to convert light beams from the plurality of light emitting elements into line light beams, and a light deflection element configured to deflect each of the line light beams. Each of the line light beams is caused to be incident on the light deflection element such that a longitudinal direction of each of the light beams is aligned with a direction of a rotating axis of the light deflection element.

BRIEF DESCRIPTION OF THE DRAWINGS

The aforementioned and other aspects, features, and advantages of the present disclosure would be better understood by reference to the following detailed description when considered in connection with the accompanying drawings, wherein.

Figure 1A:
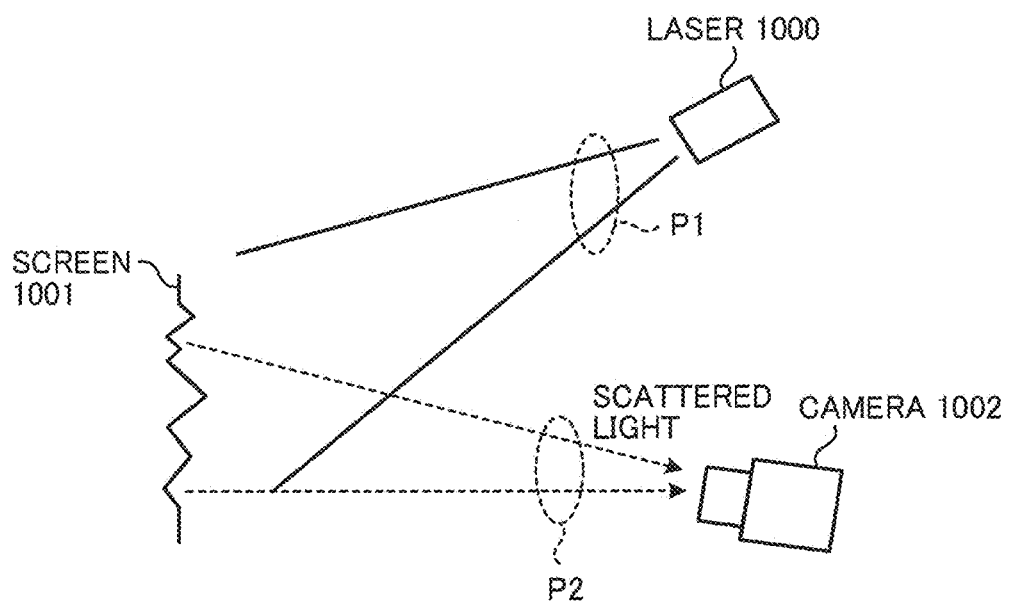
FIGS. 1A and 1B are conceptual views illustrating the principle of generation of a laser speckle noise.

The accompanying drawings are intended to depict embodiments of the present disclosure and should not be interpreted to limit the scope thereof. The accompanying drawings are not to be considered as drawn to scale unless explicitly noted.

DETAILED DESCRIPTION OF EMBODIMENTS

Embodiments of an optical device, a measurement device, a robot, an electronic apparatus, a mobile object, and a shaping device will be described with reference to the accompanying drawings. Note that the present disclosure is not limited to the following embodiments.

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

First Embodiment

A speckle that appears on an observation surface and the principle of eliminating the speckle according to a first embodiment will be described first.

Figure 1B:
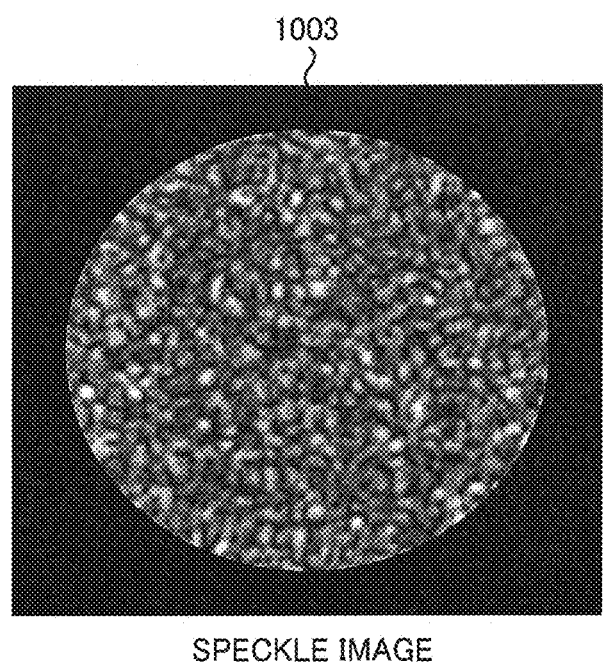

FIGS. 1A and 1B are conceptual views illustrating the principle of generation of a laser speckle (a speckle noise). FIG. 1A illustrates a system constituted by a laser light source 1000, a screen 1001 and a camera 1002. FIG. 1B is an enlarged view of a part of an observation image (a speckle image) 1003 extracted and observed by the camera 1002 when laser light is projected from the laser light source 1000 to the screen 1001. The observation image 1003 includes a speckle appeared on an image sensor of the camera 1002.

When laser light is projected from the laser light source 1000 onto the screen 1001, light P1 constituting the laser light is multiple-scattered on a surface of the screen 1001. A random phase component is added to the multiple-scattered light beams, that is, scattered light beams P2 due to the shape of irregularities (recess and projection) on the surface of the screen 1001. The scattered light beams P2 are converged on the observation surface (the image sensor) of the camera 1002 via an optical system such as a lens. The scattered light beams P2 interfere and overlap with each other on the observation surface because the laser light is coherent light. As a result, bright and dark places appear randomly on the observation surface, and a speckled speckle pattern is observed. This variation in brightness between the bright and dark places is a noise source that adversely affects image quality and various types of measurement. This phenomenon is a complicated phenomenon in which all elements of a light projection system, an object, and a light receiving system relate to each other. The speckle pattern to be observed changes depending on the lens of the camera 1002, the pixel size of the image sensor, or the like.

FIG. 1B illustrates the observation image 1003 when observed with the camera 1002. However, a similar speckle pattern appears on the retina even when the laser light projected onto the screen 1001 is observed with a human eye instead of the camera 1002.

Next, the fact that the speckle noise can be reduced will be qualitatively described. A speckle noise index will be described first. The following equation (1) is an equation representing a speckle contrast (Cs) used for the speckle noise index.

$$Cs = \sigma/S \tag{1}$$

In equation (1), S is the average brightness value in the evaluation range of a captured image when laser light is projected, and $\sigma$ is the standard deviation of brightness values in the evaluation range. As indicated by equation (1), Cs is represented by the reciprocal of a signal-to-noise ratio (SNR) indicating normal signal intensity. The lower the contrast value indicated by Cs in equation (1) is, the lower the speckle noise is and the smaller the brightness variation is.

The speckle pattern observed on the observation surface is a complicated pattern in which all elements of the light projection system, the object, and the light receiving system relate to each other. Generally, if there are a plurality of the laser light sources 1000, speckle patterns generated by the respective laser light sources 1000 are not the same but random. Consequently, if a plurality of the laser light sources 1000 are provided to generate speckle patterns that are different for each laser light source 1000 and the speckle patterns overlap on the observation surface, the speckle noise on the observation is averaged by a plurality of random speckle patterns and thus reduced.

Based on this idea, equation (1) is further transformed with respect to the relationship between speckle noise averaging and speckle noise reduction. In n (n is a natural number) speckle patterns overlapping on the observation surface (each speckle pattern image is referred to as "speckle image"), the average brightness of speckle images k is denoted by $S_k$, the standard deviation is denoted by $\sigma_k$, and the speckle contrast is denoted by $Cs_k$. In this case, when the laser light sources 1000, which are the irradiation source, each have the same power, the average brightness $S_k$, the standard deviation $\sigma_k$, and the speckle contrast $Cs_k$ of the respective speckle images are equal to each other. It is thus assumed that the relationships of the following formulae (2) to (4) are satisfied.

$$S_1 = S_2 = S_3 = \ldots S_n = S \tag{2}$$

$$\sigma_1 = \sigma_2 = \sigma_3 = \ldots \sigma_n = \sigma \tag{3}$$

$$Cs_1 = Cs_2 = Cs_3 = \ldots Cs_n = Cs \tag{4}$$

Therefore, the brightness value $S_{SUM}$ in a case of combining n speckle images is represented by the following equation (5) using the condition of equation (2).

$$S_{SUM} = S_1 + S_2 + S_3 + \ldots + S_n = S \times n \tag{5}$$

Further, the standard deviation $\sigma_{SUM}$ is represented by additivity of variance in the following equation (6).

$$\sigma_{SUM}^2 = \sigma_1^2 + \sigma_2^2 + \sigma_3^2 + \ldots + \sigma_n^2 \tag{6}$$

By applying the condition of equation (3) to equation (6), the following equation (7) is obtained.

$$\sigma_{SUM} = \sqrt{(\sigma^2 \times n)} = \sigma\sqrt{n} \tag{7}$$

As a result, the speckle contrast ($Cs_{SUM}$) of the observation image observed by overlapping n speckle images is represented by the following equation (8).

$$Cs_{SUM} = \sigma\sqrt{n}/(S \times n) = (\sqrt{n}/n) \times (\sigma/S) = 1/\sqrt{n} \times Cs \quad (8)$$

Equation (8) represents that the speckle contrast is improved (reduced) to $1/\sqrt{n}$ by averaging n speckle images. Consequently, in calculation, it is expected that the speckle contrast (Cs) is improved by $1/\sqrt{n}$ when n laser light sources 1000 are provided.

In order to obtain the above calculation result, a plurality of random speckle patterns are overlapped with each other. That is, it is presupposed that the speckle patterns generated by the respective laser light sources 1000 are different from each other. The noise reduction is achieved by, for example, the angular diversity of multiple light sources or the wavelength diversity of multiple light sources. With the angular diversity of the multiple light sources, speckle images are overlapped with each other by a method of causing incident angles of light to an observation point to be different for each light source to generate different speckle patterns for each light source. With the wavelength diversity of the multiple light sources, speckle images are overlapped with each other by a method of causing oscillation wavelengths to be different for each light source to generate different speckle patterns for each light source. In the following description, the setting of an optical device that satisfies equation (8) above using, for example, the angular diversity of multiple light sources will be examined.

Figure 2:
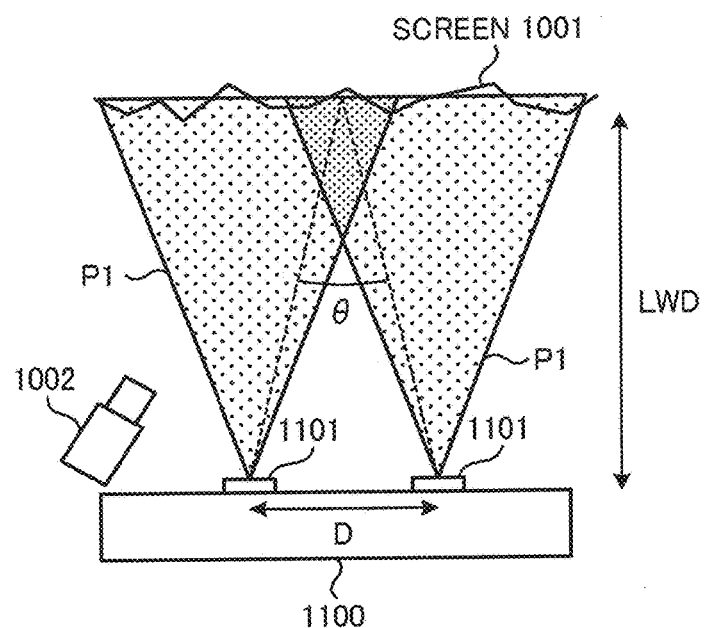
FIG. 2 is a view illustrating an example of an experimental system in which a plurality of light sources is arranged, used to verify that a speckle noise is reduced based on the angular diversity of multiple light sources.

FIG. 2 is a view illustrating an example of an experimental system in which a plurality of light sources is arranged, used to verify that a speckle noise is reduced based on the angular diversity of the multiple light sources. The experimental system illustrated in FIG. 2 includes the camera 1002, the screen 1001, and a vertical cavity surface emitting laser (VCSEL) light source 1100. The VCSEL light source 1100 is an example of "surface emitting semiconductor laser". The VCSEL light source 1100 has a large number of light emitting elements 1101 corresponding to the laser light sources 1000 in the plane. Only two light emitting elements 1101 of a large number of light emitting elements 1101 are illustrated to describe an incident angle. Each light emitting element 1101 is an element such as a laser diode that emits coherent light. A white diffusion plate is used for the screen 1001. In this experimental system, as a distance (LWD) from the VCSEL light source 1100 to the screen 1001 and a distance (D) between two light emitting elements 1101 of the VCSEL light source 1100 change, an angle θ formed by light beams respectively incident from the two light emitting elements 1101 on the screen 1001 changes accordingly. For example, when the distance (D) between the light emitting elements 1101 is increased, θ is increased, and when the distance (LWD) to the screen 1001 is increased, θ is decreased. In an experiment, a value is changed to θ while the distance (D) between elements of the VCSEL light source 1100 illustrated in FIG. 2 is gradually changed. In each value of θ, one light emitting element and a light emitting element with a distance between elements corresponding to θ are turned on, and the screen 1001 is captured by the camera 1002. The speckle contrast (Cs) of overlapping speckle patterns is then measured from the image captured by the camera 1002 for each value of θ.

Figure 3:
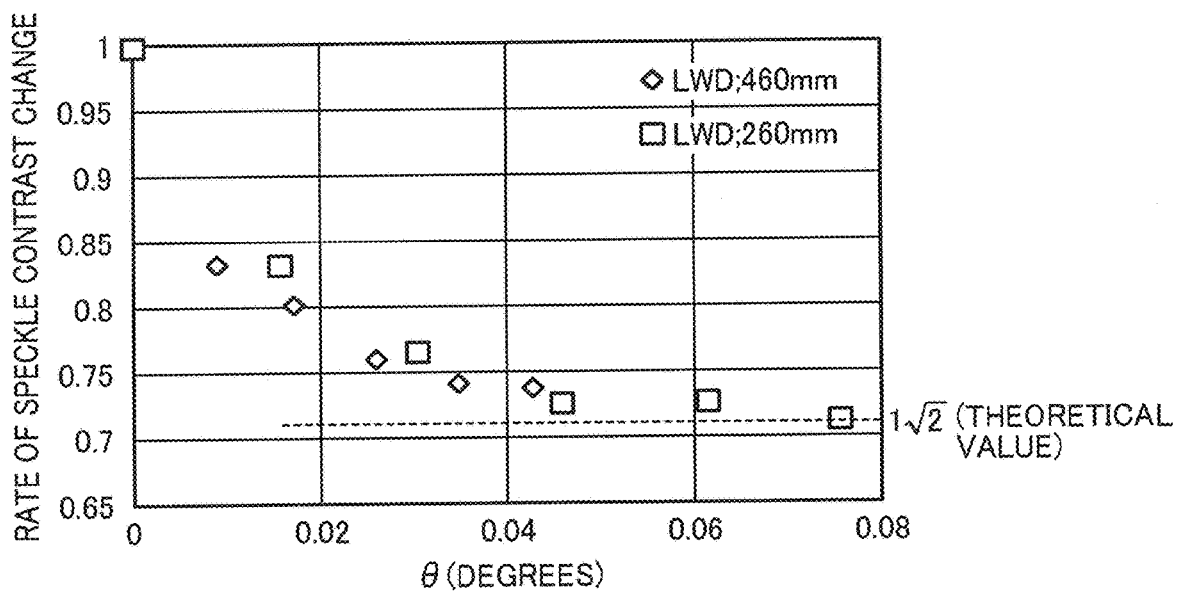
FIG. 3 is a graph illustrating an example of experimental results when $\theta$ is changed.

FIG. 3 is a graph illustrating an example of experimental results when θ is changed. FIG. 3 illustrates an experimental result when the horizontal axis represents θ and the vertical axis represents the rate of change of the speckle contrast (Cs). Note that the rate of change on the vertical axis is the rate of change of the speckle contrast (Cs) of overlapping speckle patterns of two light emitting elements with respect to the value of the speckle contrast (Cs) of a speckle pattern when only one light emitting element is turned on. The experiment was conducted under the condition that the distance (LWD) from the light emitting element 1101 to the screen 1001 is 260 mm and 460 mm.

It is found from the result illustrated in FIG. 3 that the speckle contrast (Cs) decreases as θ increases and when θ reaches approximately 0.04° to 0.05°, the speckle contrast is reduced to the theoretical value $1/\sqrt{2}$ represented by equation (8). It is found from this experimental result that θ that reduces the speckle contrast to the theoretical value $1/\sqrt{2}$ is present. Hereinafter, each setting of the optical device that reduces the speckle contrast to the theoretical value indicated by the experimental result is referred to as "setting of achieving a speckle noise reduction effect" or the like. From the result (an approximate curve derived from plotting) illustrated in FIG. 3, it is believed that the relationship between the rate of change of the speckle contrast (Cs) and θ is not affected by a change in LWD.

As described above, θ that reduces the speckle contrast to the theoretical value $1/\sqrt{2}$ is not limited to the values within the range of 0.04° to 0.05° because the value of θ changes depending on various conditions such as geometric conditions of the camera 1002 and the screen 1001 and the surface roughness of a measurement target. However, this experimental result suggests that the speckle noise reduction effect can be obtained by the angular diversity of the multiple light sources using the VCSEL light source 1100, a design layout is required to secure an appropriate distance between the light emitting elements 1101 in view of the distance to the target, or the like. In the experiment, light from each light emitting element 1101 in the plane of the VCSEL light source 1100 is directly incident on the screen 1001. However, an optical element such as a lens and a light deflection element may be disposed in the optical path from each light emitting element 1101 to the screen 1001. In this case, in order to achieve the speckle noise reduction effect by the angular diversity of the multiple light sources, it is suggested that a design including the optical element to be disposed is required.

Next, a description will be given of an example of a case where the optical device is set with "setting of achieving a speckle noise reduction effect" as illustrated in the experimental result of FIG. 3. A configuration of a laser scanning laser projection system will be described as an example. In the present embodiment, a single line light beam is formed by a plurality of the laser light sources 1000, and the output of the laser light source 1000 is modulated according to the timing of laser scanning to project a desired projection pattern onto an observation target. That is, only the number of light sources for forming a single line light beam is required, and the number of line light beams to be formed may not be increased according to the brightness gradation of a projection pattern. Consequently, the number of light sources required to sufficiently improve the speckle contrast can be reduced regardless of the brightness gradation of a projection pattern, and the system can be easily downsized. In addition, when the width of a single line light beam to be formed is sufficiently narrowed within the measurement range, the pattern can be changed with high resolution, and thus the measurement accuracy is improved.

Figure 4A:
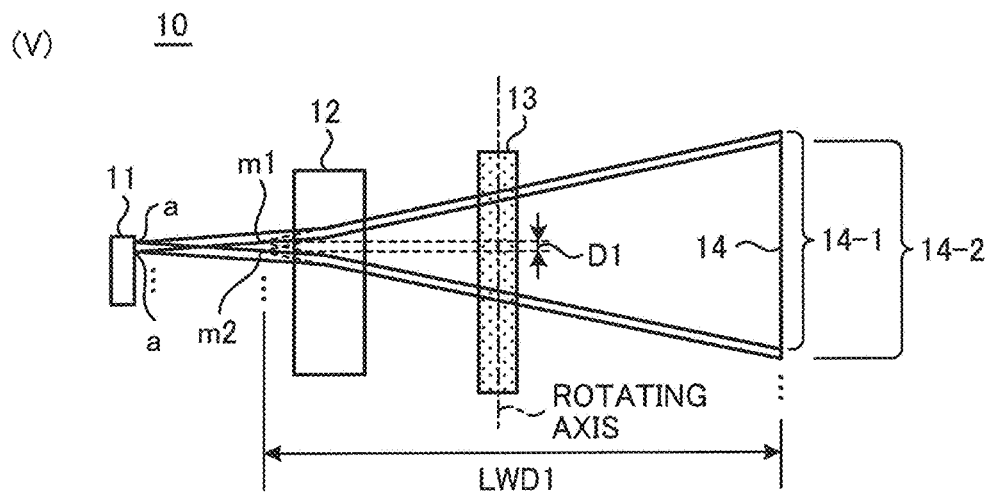
FIGS. 4A and 4B are views illustrating an example of a configuration of an optical device (when a mirror surface of a light deflection element is large) according to a first embodiment.
Figure 4B:
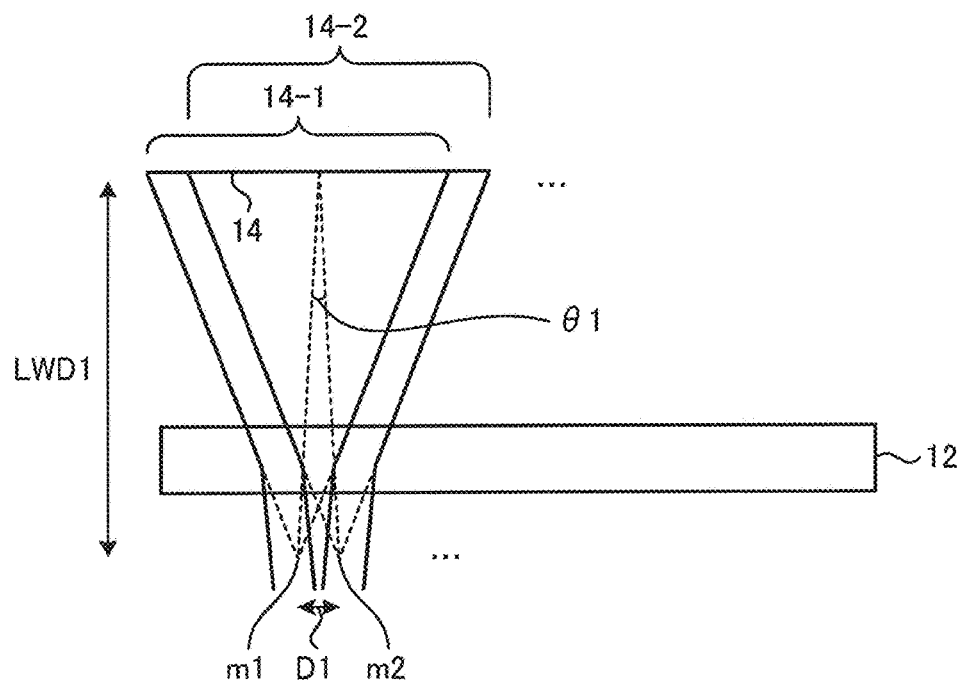
Figure 5A:
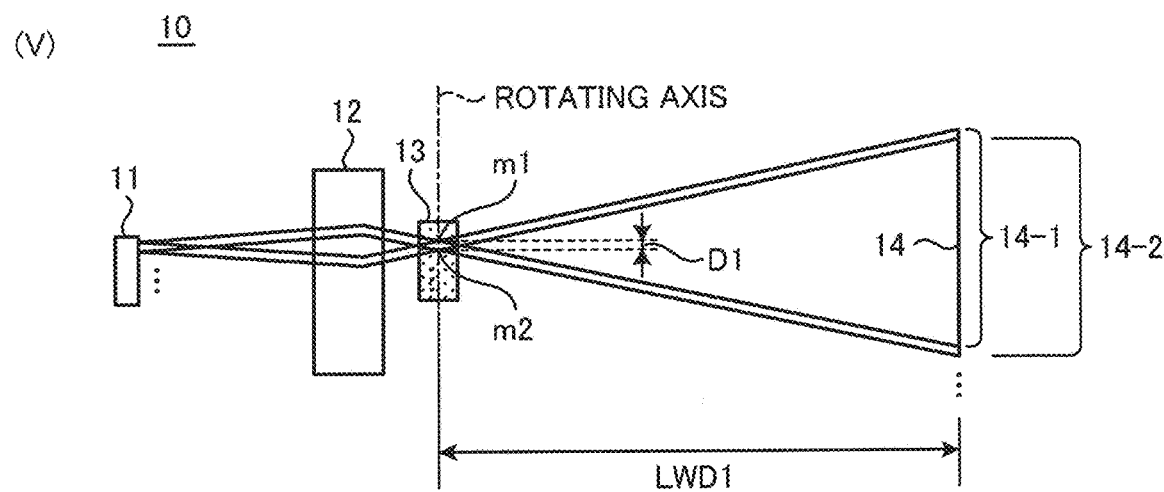
FIGS. 5A and 5B are views illustrating an example of a configuration of the optical device (when the mirror surface of the light deflection element is small) according to the first embodiment.
Figure 5B:
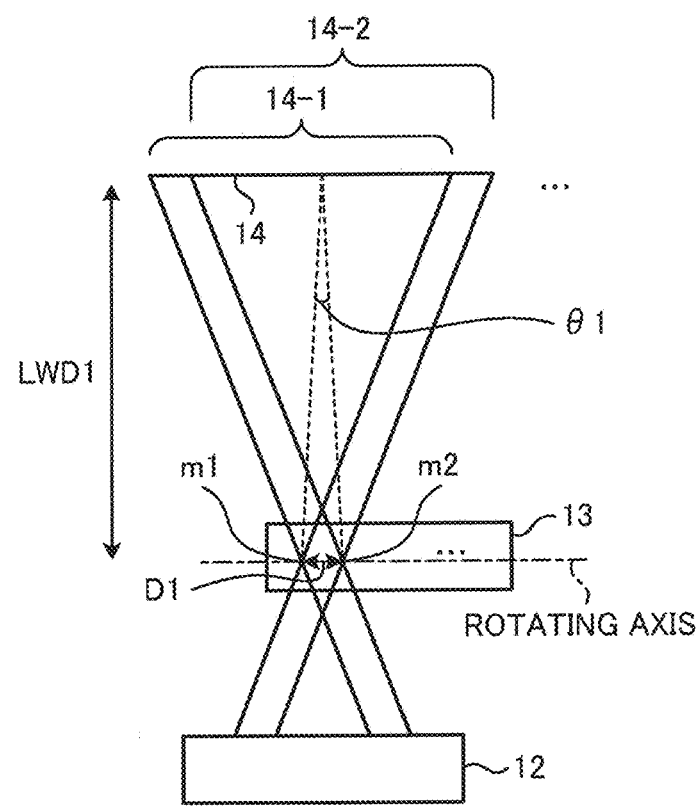

FIGS. 4A, 4B, 5A, and 5B are views illustrating examples of configurations of the optical device. FIG. 4A illustrates a configuration when the mirror surface of a light deflection element is large. FIG. 5A illustrates a configuration when the mirror surface of the light deflection element is small like a micro electro mechanical systems (MEMS) mirror. FIGS. 4B and 5B illustrate explanatory views of the relationship between the respective optical devices illustrated in FIGS. 4A and 5B and θ of FIG. 2. In FIG. 4B, a VCSEL array and a mirror are omitted in order to clarify an optical path. In FIG. 5B, the VCSEL array is omitted in order to clarify an optical path. FIGS. 4A, 4B, 5A, and 5B illustrate the configuration of the optical device as viewed from a vertical direction (V). The vertical direction (V) indicates a direction orthogonal to a horizontal direction (H) to be described later.

An optical device 10 of an example illustrated in FIG. 4A includes a VCSEL array 11 having a plurality of light emitting elements a, a line generator 12, and a mirror (a light deflection element) 13.

The line generator 12 is an example of an optical unit that converts light from each light emitting element a on the VCSEL array 11 into line light. In FIGS. 4A and 4B (and in FIGS. 5A and 5B), the lens configuration of the line generator 12 is omitted in order to clarify an optical path.

The mirror surface (a hatched portion) of the mirror 13 is directed to the front side of the drawing in FIG. 4A. The mirror surface of the mirror 13 is movable around its rotating axis illustrated in FIG. 4A.

FIGS. 4A and 4B illustrate optical paths of light beams respectively emitted from two adjacent light emitting elements a on the VCSEL array 11 in an overlapping manner. As illustrated in FIGS. 4A and 4B, the light from each light emitting element a is converted into line light by the line generator 12. The light emitted from the line generator 12 is reflected by the mirror surface of the mirror 13 and the observation target is irradiated with the light as one line light beam 14. The line light 14 is formed by overlapping all or some of light beams from the respective light emitting elements a (at least two adjacent light emitting elements a).

The optical device 10 drives the mirror surface of the mirror 13 around the rotating axis and modulates the output of each light emitting element a to execute control for the purpose of forming a predetermined stripe pattern. A stripe pattern image is thus projected onto the observation target according to an operation of scanning the observation target with line light. A projection image such as a stripe pattern formed by projecting each line light beam is captured by the camera 1002 (see FIG. 1) or the like and used for a process of the observation target (for example, a process such as three-dimensional measurement of the observation target).

In the present embodiment, "focal point in the longitudinal direction of each line light beam that is formed by the line generator 12" is defined as "virtual light source". In the configuration illustrated in the present embodiment, a pitch (D1) of the respective virtual light sources m1, m2, . . . of the respective line light beams (line light beams 14-1, 14-2, . . . ) corresponds to the distance (D) between the light emitting elements 1101 illustrated in FIG. 2. In addition, a distance (LWD1) between a plane including the virtual light sources m1, m2, . . . and the observation target corresponds to the distance (LWD) from the VCSEL light source 1100 to the screen 1001 illustrated in FIG. 2. Further, an angle (θ1) formed by light beams emitted from adjacent virtual light sources (for example, the light source m1 and the light source m2) to the observation target corresponds to the angle θ formed by light beams emitted from the two light emitting elements 1101 illustrated in FIG. 2 to the screen 1001.

The optical device 10 is configured to have the speckle noise reduction effect. That is, the pitch (D1), the distance (LWD1), and the angle (θ1) are each set to satisfy values converging to the theoretical value $1/\sqrt{2}$ as illustrated in FIG. 3.

As illustrated in FIGS. 4A and 4B, when the mirror surface is sufficiently greater than the length of a light beam (the line light beam 14) emitted from the line generator 12 in the longitudinal direction (the direction of the rotating axis of the mirror 13) at the position of the mirror 13, the length of the line light beam 14 in the longitudinal direction (the direction of the rotating axis of the mirror 13) needs not to be adjusted. The line light beam 14 can thus enter the mirror surface without any adjustments.

As illustrated in FIGS. 5A and 5B, when the mirror surface is small (for example, an MEMS mirror), the length of a light beam (the line light beam 14) emitted from the line generator 12 in the longitudinal direction (the direction of the rotating axis of the mirror 13) needs to be adjusted, and then the line light beam 14 having been subjected to adjustment enters the mirror surface. In an example illustrated in FIGS. 5A and 5B, line light is once condensed by the line generator 12 and then enters the mirror surface. In this case, the virtual light sources m1, m2, . . . are placed at positions illustrated in FIGS. 5A and 5B. The setting conditions for the pitch (D1) of the virtual light sources m1, m2, . . . , the distance (LWD1), and the angle (θ1) are similar to those illustrated in FIGS. 4A and 4B.

The mirror surface is used for uniaxial scanning of light from a virtual line light source designed to achieve an effect based on the angular diversity of the multiple light sources. Consequently, the mirror surface may be large or small as long as scanning line light can enter the mirror surface. For example, FIGS. 5A and 5B illustrate the configuration when the mirror surface is small. However, a large mirror surface that condenses light once may be used. In addition, in FIGS. 5A and 5B, the disposition position of the mirror surface needs not to be the focal point of line light and may be shifted in the optical axis direction as long as scanning line light enters the mirror surface. However, the mirror surface is minimized when the mirror surface is disposed at the focal point of line light.

As described above, the optical device is designed to achieve the effect of the angular diversity of the multiple light sources using a plurality of light sources such as the VCSEL array 11. As a result, an observation image in which different speckle pattern images from the respective light sources overlap, that is, an observation image with reduced speckle noise can be observed, and the measurement accuracy of a measurement target can be improved.

First Example

An example of a device that employs the optical device according to the present embodiment is described. The optical device according to the present embodiment may be employed in a measurement device used to measure an observation target or the like. Here, an application example of the optical device according to the present embodiment to a three-dimensional measurement device that three-dimensionally measures an observation target (also referred to as a measurement target) is described.

Figure 6:
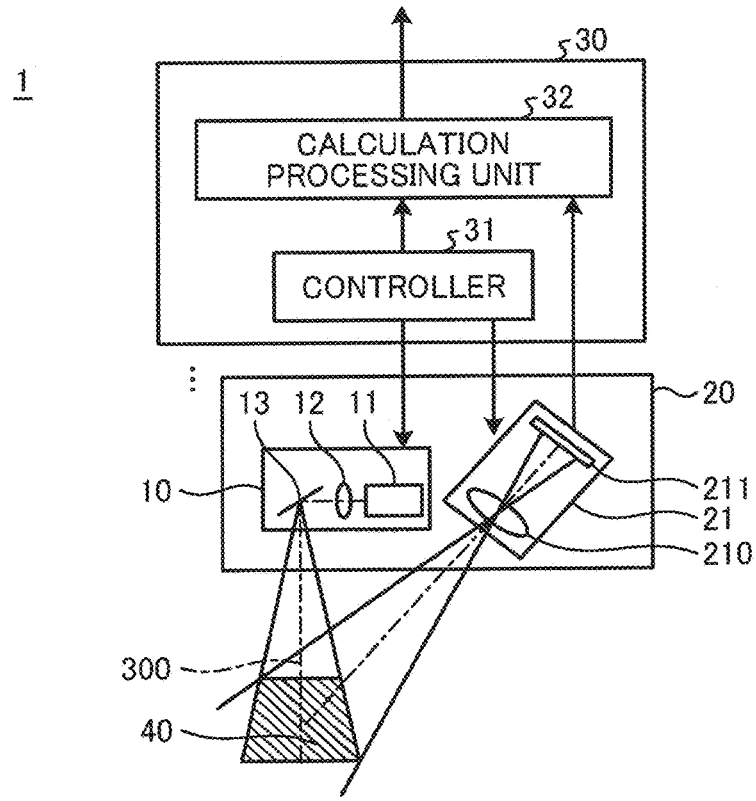
FIG. 6 is a view illustrating an example of a measurement device according to the first embodiment.

FIG. 6 is a view illustrating an example of a measurement device. A measurement device 1 illustrated in FIG. 6 includes a measurement information acquisition unit 20 and a control unit 30.

The measurement information acquisition unit 20 includes the optical device 10 functioning as a projection unit and a camera 21 functioning as a capturing unit. The optical device 10 includes the VCSEL array 11, the line generator 12 (optical system), and the light deflection element (the mirror) 13. The measurement information acquisition unit 20 deflects light beams of a plurality of the light emitting elements a in the VCSEL array 11 emitted from the line generator 12 by the light deflection element 13 for scanning according to control of a controller 31 in the control unit 30. The controller 31 adjusts the output and turn-on timing of each light emitting element a of the VCSEL array 11 during optical scanning to project pattern light onto the entire measurement target. For example, by controlling turning on and off (switching on and off) of the light emitting element a, it is possible to project a desired projection pattern such as a black and white gray code pattern onto the measurement target.

The position and angle of the camera 21 are fixed so that a projection center 300 of pattern light (a projection image) projected onto the measurement target by the optical device 10 is the center of a capturing area 40. The camera 21 can thus capture a projection area.

The camera 21 includes a lens 210 and an image sensor 211. For example, a charge coupled device (CCD) image sensor or a complementary metal oxide semiconductor (CMOS) image sensor is used as the image sensor 211. Light incident on the camera 21 forms an image on the image sensor 211 through the lens 210 and is photoelectrically converted. An electric signal photoelectrically converted by the image sensor 211 is converted into an image signal, and the image signal is output from the camera 21 to a calculation processing unit 32 of the control unit 30.

The control unit 30 executes control of projecting pattern light by the optical device 10 and control of capturing the pattern light by the camera 21 to perform a calculation process such as three-dimensional measurement of the measurement target based on the image signal captured by the camera 21. The controller 31 may execute control of switching pattern light projected by the optical device 10 to another pattern light. In addition, the controller 31 may execute control of outputting calibration information used by the calculation processing unit 32 to calculate three-dimensional coordinates.

The calculation processing unit 32 of the control unit 30 calculates three-dimensional coordinates based on the input image signal to acquire a three-dimensional shape. Further, the calculation processing unit 32 outputs three-dimensional shape information indicating the calculated three-dimensional shape to a personal computer (PC) or the like (not illustrated) in response to an instruction from the controller 31. FIG. 6 illustrates a configuration in which one measurement information acquisition unit 20 is attached to the control unit 30. However, a plurality of the measurement information acquisition units 20 may be attached to the control unit 30.

Figure 7:
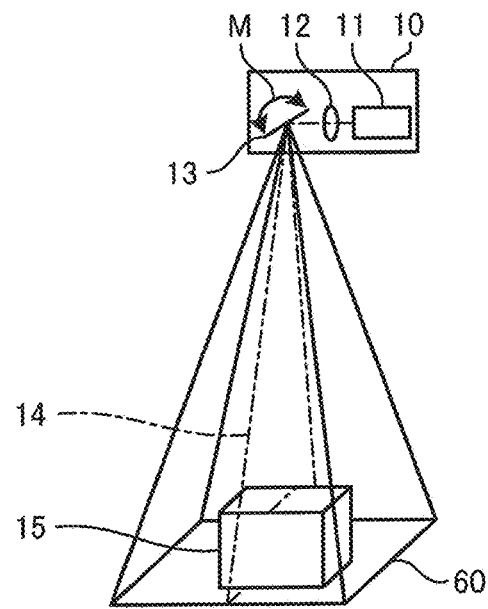
FIG. 7 is a view illustrating an example of light projection onto a measurement target by the optical device.

FIG. 7 is a view illustrating an example of light projection onto a measurement target by the optical device 10. In FIG. 7, the optical device 10 emits the line light 14 toward a measurement target 15. The line light 14 is formed by overlapping a plurality of light beams from the respective light emitting elements a in the VCSEL array 11, and is deflected on the mirror surface of the light deflection element (the mirror) 13 to be irradiated to the measurement target 15 as indicated by broken lines in FIG. 7. Specifically, the light deflection element 13 drives the mirror surface in a direction M around the longitudinal axis of line light illustrated in FIG. 7 to deflect light emitted to the mirror surface and each line light beam is controlled to be formed into predetermined pattern light. As a result, the measurement target 15 is irradiated with two-dimensional pattern light and a projection image 60 is projected onto the measurement target 15. The projection image 60 is projected onto a region including the measurement target 15, for example.

Figure 8:
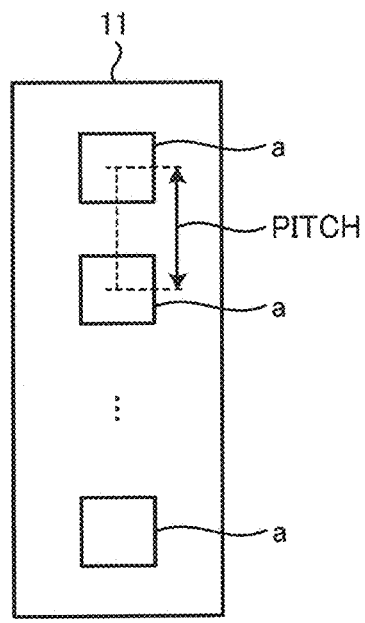
FIG. 8 is a view illustrating an example of a configuration of a VCSEL array.

The configuration of a light-source unit will be described by taking a VCSEL array as an example. FIG. 8 is a view illustrating an example of a configuration of the VCSEL array. The VCSEL array 11 illustrated in FIG. 8 is a surface emitting semiconductor laser capable of easily integrating light emitting elements on an identical substrate, and has a plurality of the light emitting elements a arranged in a one-dimensional manner.

The pitch of the respective light emitting elements a illustrated in FIG. 8 is set such that line light beams from the respective light emitting elements a overlap as the line light 14 on the measurement target 15 under a predetermined condition (setting of achieving a speckle noise reduction effect).

The arrangement of the light emitting elements a illustrated in FIG. 8 is an example, and the light emitting elements a may be arranged two-dimensionally. For example, the light emitting elements a may be arranged in a honeycomb structure so that more elements can be arranged, or may be arranged in other arrangement structures. In addition, while an opening of each of the light emitting elements a is formed in a rectangular shape, the opening may be formed in a hexagonal shape, for example, or in other shapes. The wavelength of laser light of each light emitting element a may be appropriately set. For example, either a visible wavelength or an invisible wavelength may be used. Each light emitting element a may be configured so that its light emission timing is independently controllable.

Figure 9:
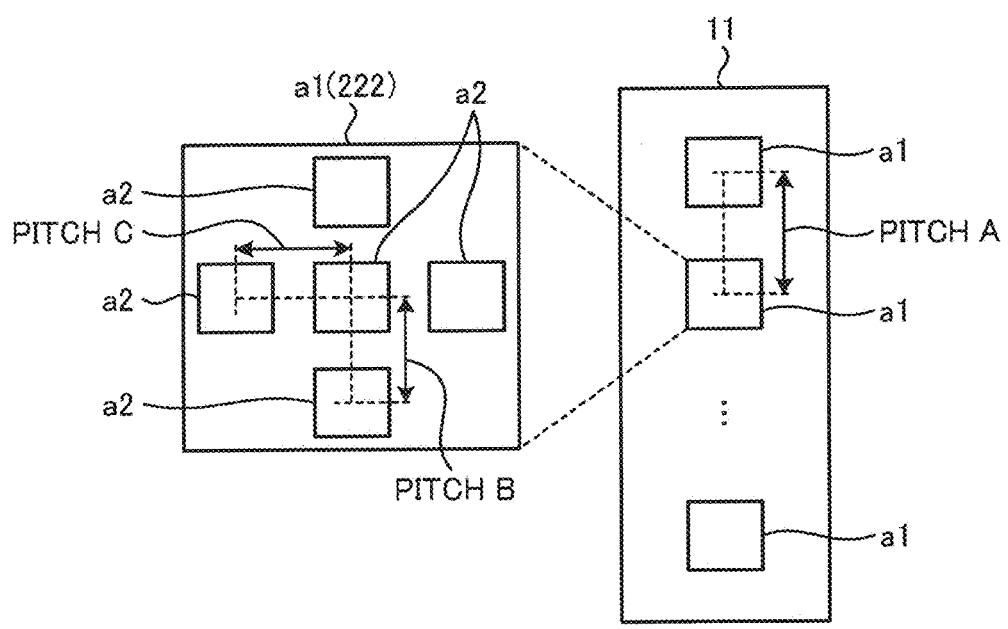
FIG. 9 is a view illustrating another example of the configuration of the VCSEL array.

FIG. 9 is a view illustrating another example of the configuration of the VCSEL array 11. The VCSEL array 11 illustrated in FIG. 9 includes at least one light emitting element group a1 that is called a layer and controlled to cause a plurality of light emitting elements to emit light simultaneously. While FIG. 9 illustrates a configuration in which the light emitting element groups a1 are one-dimensionally arranged, the light emitting element groups a1 may be two-dimensionally arranged.

In a layer 222 illustrated in FIG. 9, five light emitting elements a2 are arranged in a cross shape. In the identical layer 222, the respective light emitting elements a2 are controlled to emit light at the same timing.

A pitch A of the respective layers 222 and pitches of the respective light emitting elements a2 illustrated in FIG. 9 (a pitch B and a pitch C) are appropriately different depending on the specifications of the measurement device 1, but are set such that line light beams from the respective light emitting elements a2 overlap as the line light 14 on the measurement target 15 under a predetermined condition (setting of achieving a speckle noise reduction effect).

While five light emitting elements a2 are arranged on the layer 222 in a cross shape, the present disclosure is not limited to such an arrangement. The number of the light emitting elements a2 may be increased or decreased. Alternatively, more light emitting elements a2 may be arranged in a layout like a honeycomb structure.

In addition, while an opening of each of the light emitting elements a2 is formed in a rectangular shape, the opening may be formed in a hexagonal shape, for example, or in other shapes. The light emission timing of each layer 222 may be controlled independently.

Figure 10:
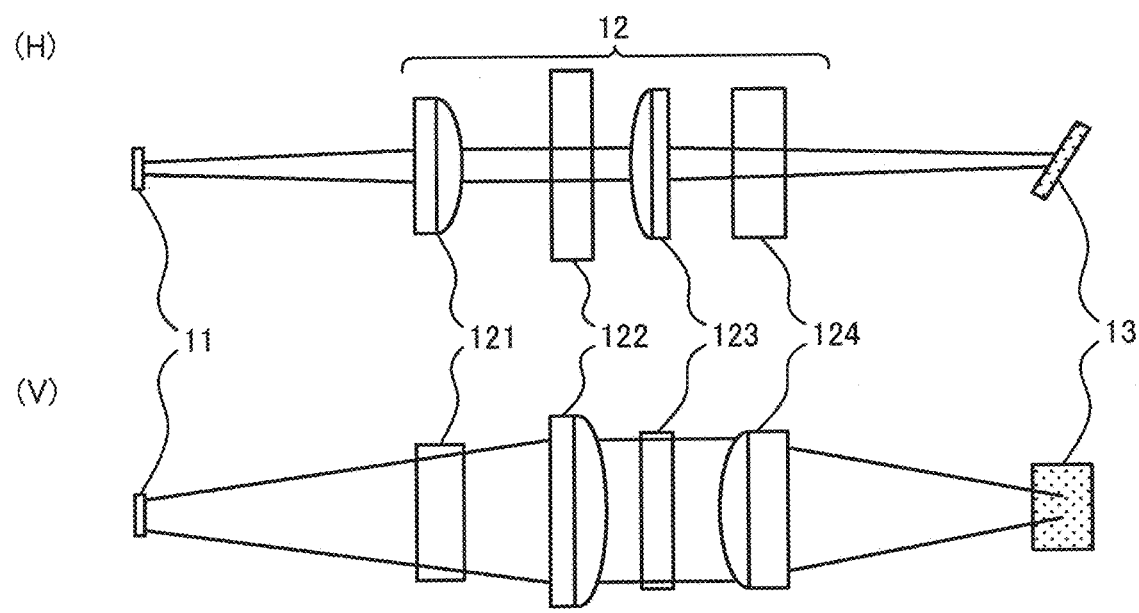
FIG. 10 is a view illustrating an example of an optical system of the optical device.

FIG. 10 is a view illustrating an example of an optical system of the optical device 10. In FIG. 10, the optical system of the optical device 10 is illustrated when viewed from the horizontal direction (H) and from the vertical direction (V).

FIG. 10 illustrates four cylindrical lenses 121 to 124 as an example of a lens configuration of the line generator 12. The cylindrical lenses 121 to 124 convert light from each light emitting element a of the VCSEL array 11 into line light.

Specifically, in the horizontal direction (H), light diverging from the VCSEL array 11 is converted into a parallel light beam or a substantially parallel light beam by the cylindrical lens 121, and the width of line light in a widthwise direction is formed by the cylindrical lens 123. In the vertical direction (V), light diverging from the VCSEL array 11 is converted into a parallel light beam or a substantially parallel light beam by the cylindrical lens 122, and the length of line light in the longitudinal direction is formed by the cylindrical lens 124. In this case, a focus is formed at a position on the mirror (the light deflection element) 13 where light is condensed. Each line light is formed on the light deflection element 13 in the setting of achieving a speckle noise reduction effect.

The cylindrical lenses 121 to 124 are made of, for example, glass or plastic. The material is not limited to these materials mentioned above. Other materials may be used. In addition, surface processing such as anti reflection coating may be applied to the cylindrical lenses 121 to 124.

The cylindrical lenses may be disposed in either direction. However, in view of the number of times of refraction, it is preferable to dispose the cylindrical lenses so that their convex surfaces face to each other as illustrated in FIG. 10.

The light deflection element 13 is driven around the longitudinal axis of line light to scan the measurement target 15 with line light incident on the light deflection element 13. By modulating the output of line light by the controller 31 during scanning, a projection image of a predetermined pattern is projected onto the measurement target 15.

Figure 11:
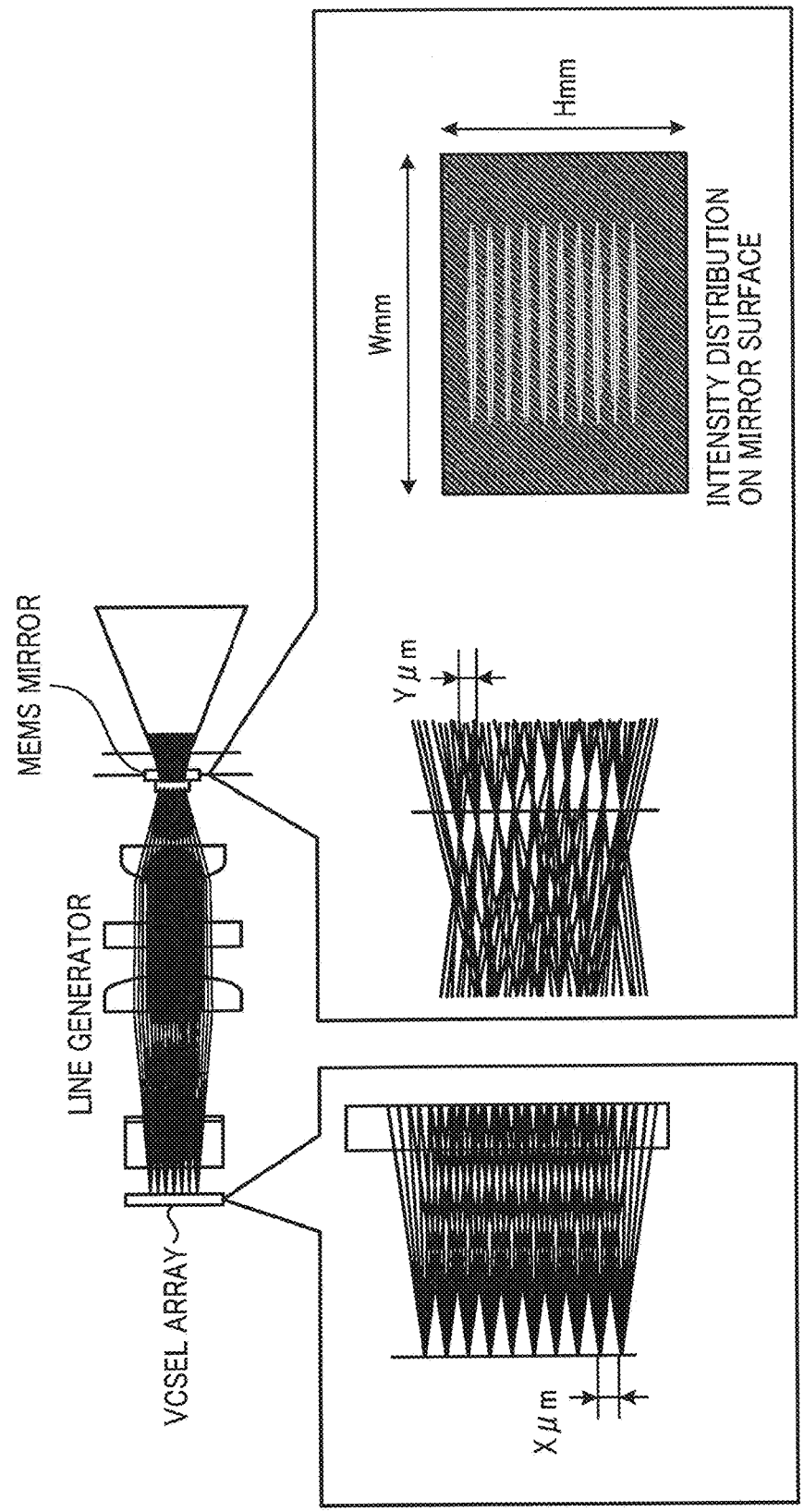
FIG. 11 is a view illustrating an optical path of light in the optical device.
Figure 12:
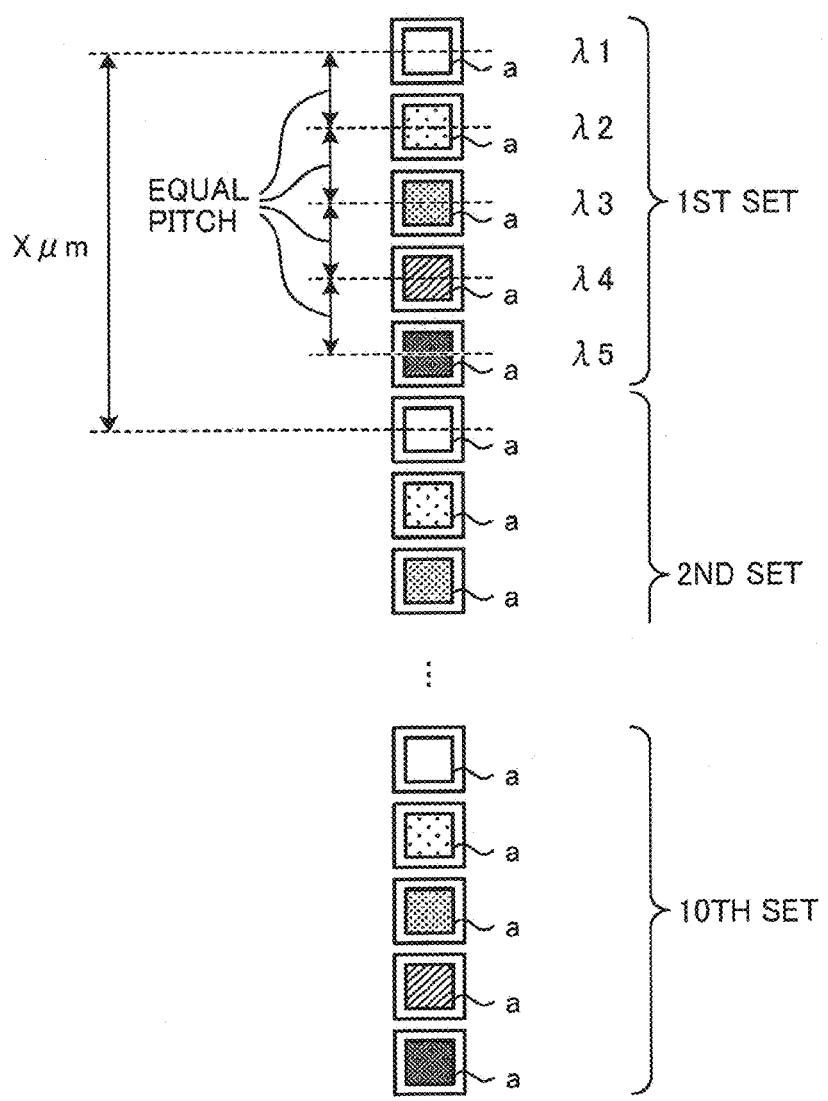
FIG. 12 is a view illustrating an example of an arrangement of light emitting elements in the VCSEL array of the optical device.

FIG. 11 is a view illustrating an optical path of light in the optical device 10. FIG. 11 illustrates the optical device 10 that uses a MEMS mirror having a narrow mirror surface as the light deflection element 13. As illustrated in FIG. 12, in the VCSEL array 11 of the optical device 10 illustrated in FIG. 11, five different light emitting elements a with five different wavelengths (a wavelength λ1, a wavelength λ2, a wavelength λ3, a wavelength λ4, and a wavelength λ5) are arranged at equal pitches to constitute one set. Ten sets of the light emitting elements a in total (5 types of wavelengths×10 sets=50 pieces) are one-dimensionally arranged. In each set, the light emitting elements a are arranged in a predetermined wavelength order. That is, the light emitting elements a with the respective wavelengths are arranged periodically in FIG. 12. In FIG. 12, the light emitting elements a with the same wavelength in adjacent sets are arranged at a pitch of X μm. The speckle patterns generated by the light emitting elements a with the wavelengths λ1 to λ5 in the same set are set to be different from each other. That is, it is set so as to achieve the effect of the wavelength diversity of the multiple light sources. Note that this configuration is one example and at least some of the wavelengths may be different from each other.

The optical path illustrated in FIG. 11 is formed by overlapping line light beams from the light emitting elements a with the wavelength λ1 of the VCSEL array 11. The optical paths of the light emitting elements a with the wavelengths λ2 to λ5 are omitted in order to clarify the optical path. As illustrated in FIG. 11, the line generator 12 forms line light by light from each light emitting element a of the VCSEL array 11. Each light emitting element a emits light at the same divergence angle. The line generator 12 adjusts the spread angle of line light in the longitudinal direction and the width of line light in the widthwise direction. In this case, line light is adjusted in each direction. That is, the longitudinal direction of line light is adjusted on the mirror surface and the widthwise direction of line light is adjusted so as to be condensed in the measurement range. Each line light beam finally formed on the mirror surface is thus longer in the widthwise direction than in the longitudinal direction. FIG. 11 also illustrates a mirror surface intensity distribution simulation. Similar incident line light to that described above is also found in the mirror surface intensity distribution simulation. As described above, by condensing line light in the longitudinal direction on the mirror surface, the mirror surface can be made smaller and the spread angle of line light in the longitudinal direction can be increased. When the number of line light beams formed from the respective light emitting elements a is small, as illustrated in FIG. 11, the mirror is sized so that the side of the mirror in the widthwise direction of line light formed is longer than that in the longitudinal direction (Wmm>Hmm).

The distance between the light emitting elements a may be different from the distance between line light beams on the mirror surface. For example, the distance (X μm) between light emitting elements with the same wavelength is made different from the distance (Y μm) between line light beams with the same wavelength incident on the light deflection element. The relationship between the distance (X μm) between light emitting elements with the same wavelength and the distance (Y μm) between line light beams with the same wavelength incident on the light deflection element will be described below.

When light emitting elements with the same wavelength generate different speckle patterns, that is, when the optical device 10 is configured to achieve the speckle noise reduction effect based on the angular diversity of the multiple light sources, the distance (X μm) between light emitting elements with the same wavelength and the distance (Y μm) between line light beams with the same wavelength incident on the light deflection element satisfy the following relationship: the distance between light emitting elements with the same wavelength is greater than or equal to the distance between line light beams with the same wavelength incident on the light deflection element.

As another example, the distance between light emitting elements with the same wavelength and the distance between line light beams with the same wavelength incident on the light deflection element may satisfy the following relationship: the distance between light emitting elements with the same wavelength<the distance between line light beams with the same wavelength incident on the light deflection element. In this case, the distance between line light beams with the same wavelength incident on the light deflection element is set to 35 μm or more. This value is calculated with reference to FIG. 3. Specifically, the speckle noise reduction effect is achieved at an angle (θ=0.04 deg), at which the effect based on the angular diversity of the multiple light sources starts to occur, or more. For example, in view of using a microscope, LWD can be set to 50 mm or more. From these factors, the predetermined distance Y between line light beams with the same wavelength incident on the light deflection element is calculated to be approximately 34.9 μm or more, and thus Y is approximately 35 μm. The calculation formula is expressed as: Y=2×LWD×tan (θ/2) and thus D=2×50×tan (0.02)=34.907 (approximately 35) μm.

Furthermore, when the relationship of the distance between light emitting elements with the same wavelength<the distance between line light beams with the same wavelength incident on the light deflection element is satisfied, the speckle noise reduction effect is achieved at an angle ($\theta$=0.04 deg) at which the effect of the angular diversity of the multiple light sources starts to occur or more. Consequently, the upper limit is not determined for the distance between line light beams with the same wavelength incident on the light deflection element. However, in practice, the upper limit is determined by reflecting a mirror size and the degree of the speckle noise reduction effect. For example, it is assumed a case where the mirror size is 15 mm and the speckle noise is desirably reduced by half. In this case, four light sources are required and the distance between line light beams with the same wavelength incident on the light deflection element is 5 mm (=15/(4−1)) at the maximum.

As illustrated in FIG. 11, when a speckle noise is reduced by the effect of the wavelength diversity of the multiple light sources and the effect of the angular diversity of the multiple light sources, the pitch between the light emitting elements a with different wavelengths of the VCSEL array 11 may be shorter than X μm. Consequently, as compared with a case where the same speckle noise reduction effect is achieved by using only the effect of the angular diversity of the multiple light sources, the integration density of the light emitting elements a arranged in the VCSEL array 11 is improved. The improvement of the integration density leads to the increase in light intensity and the speckle noise reduction effect. When the integration density is improved, the size of a VCSEL chip can be further reduced with the same speckle contrast, and the light intensity can be increased and a speckle noise can be further reduced with the same area.

Figure 13:
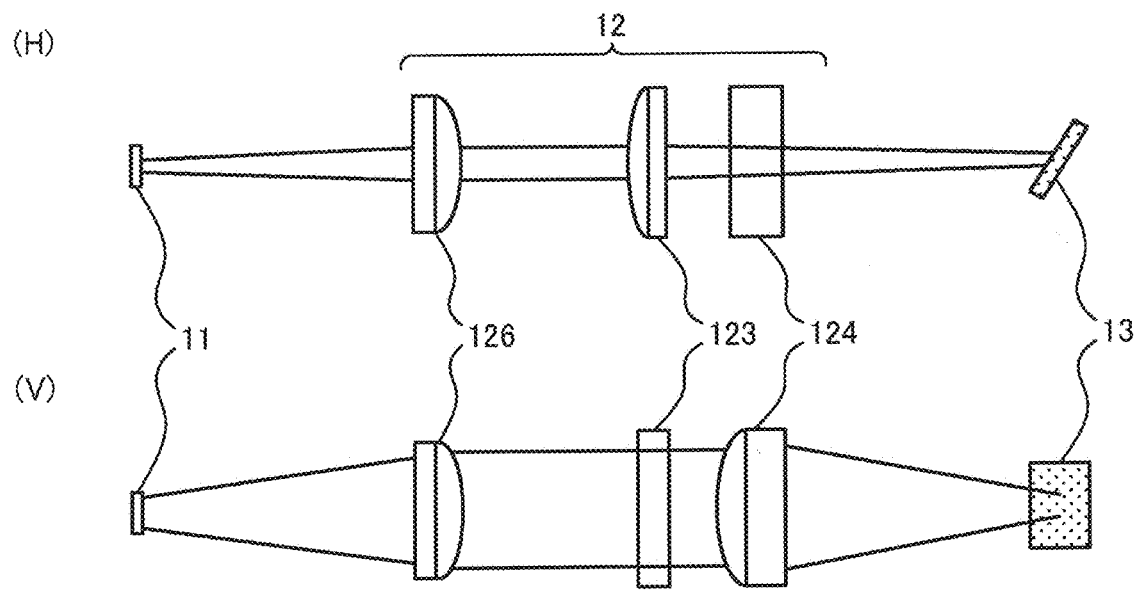
FIG. 13 is a view illustrating another example of the optical system of the optical device.

FIG. 13 is a view illustrating another example of the optical system of the optical device 10. FIG. 13 illustrates a spherical lens 126 and two cylindrical lenses (the cylindrical lens 123 and the cylindrical lens 124) as an example of the lens configuration of the line generator 12. In FIG. 10, light diverging from the VCSEL array 11 is converted into a parallel light beam or a substantially parallel light beam using different cylindrical lenses 121 and 122 in the horizontal direction (H) and the vertical direction (V), respectively. In FIG. 13, this action is performed by one spherical lens 126. It is thus possible to reduce the number of lenses required by using the spherical lens.

Figure 14:
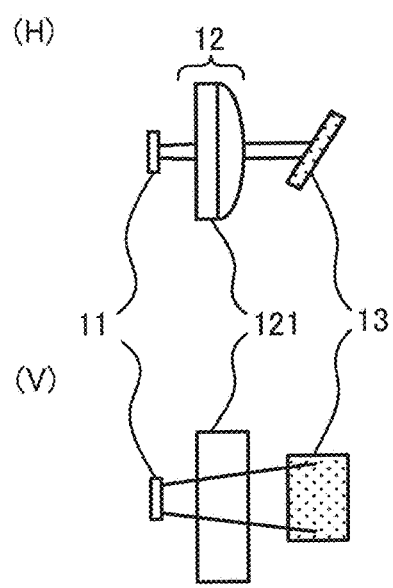
FIG. 14 is a view illustrating yet another example of the optical system of the optical device.

FIG. 14 is a view illustrating yet another example of the optical system of the optical device 10. FIG. 14 illustrates the cylindrical lens 121 as an example of the lens configuration of the line generator 12. In the horizontal direction (H), the cylindrical lens 121 forms the width of line light in the widthwise direction by light diverging from the VCSEL array 11. In the vertical direction (V), the length of line light in the longitudinal direction is formed by only light diverging from the VCSEL array 11. As one lens is used in this configuration, the number of lenses required can be minimized.

Figure 15:
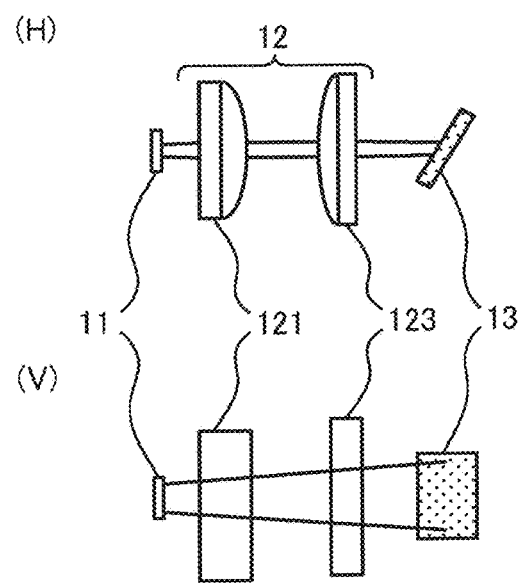
FIG. 15 is a view illustrating still another example of the optical system of the optical device.

FIG. 15 is a view illustrating still another example of the optical system of the optical device 10. FIG. 15 illustrates two cylindrical lenses (the cylindrical lens 121 and the cylindrical lens 123) as an example of the lens configuration of the line generator 12.

In the horizontal direction (H), light diverging from the VCSEL array 11 is converted into a parallel light beam or a substantially parallel light beam by the cylindrical lens 121, and the width of line light in the widthwise direction is formed by the cylindrical lens 123. In the vertical direction (V), the length of line light in the longitudinal direction is formed by only light diverging from the VCSEL array 11.

Figure 16:
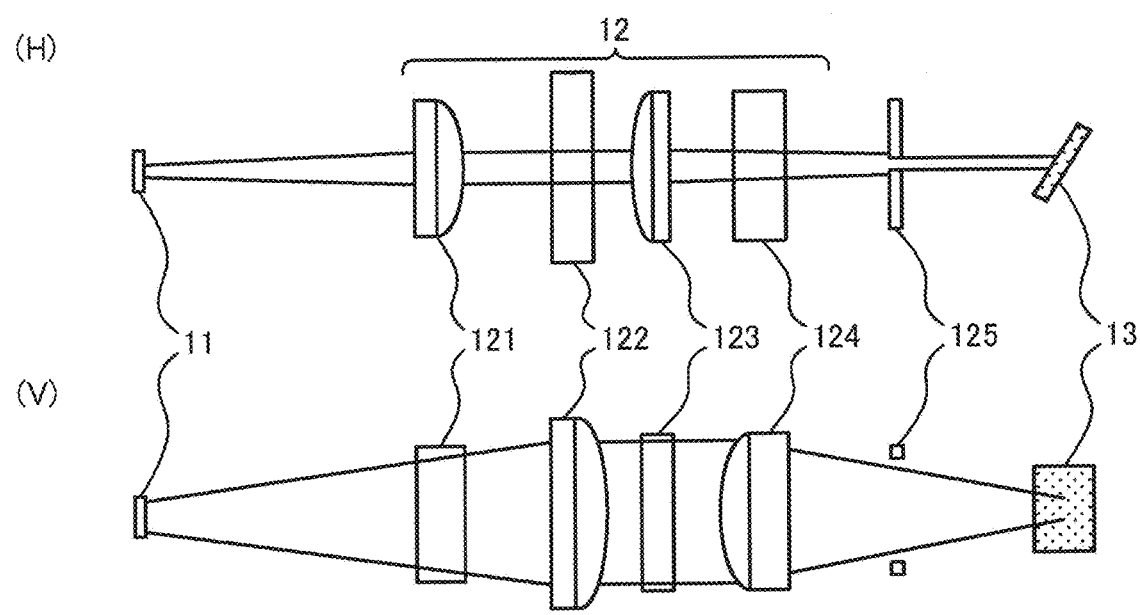
FIG. 16 is a view illustrating further example of the optical system of the optical device.

FIG. 16 is a view illustrating further example of the optical system of the optical device 10. Referring to FIG. 16, a stop 125 is added to the lens configuration illustrated in FIG. 10. If light is not able to be sufficiently condensed on the light deflection element 13 in the lens configuration illustrated in FIG. 10, the stop 125 is disposed. The stop is not limited to the stop 125. At least one stop 125 may be disposed at any position. While the stop 125 for the horizontal direction (H) is illustrated in FIG. 16, the stop 125 for the vertical direction (V) may also be disposed. In addition, the stop 125 may be disposed for the purpose of removing stray light.

Figure 17:
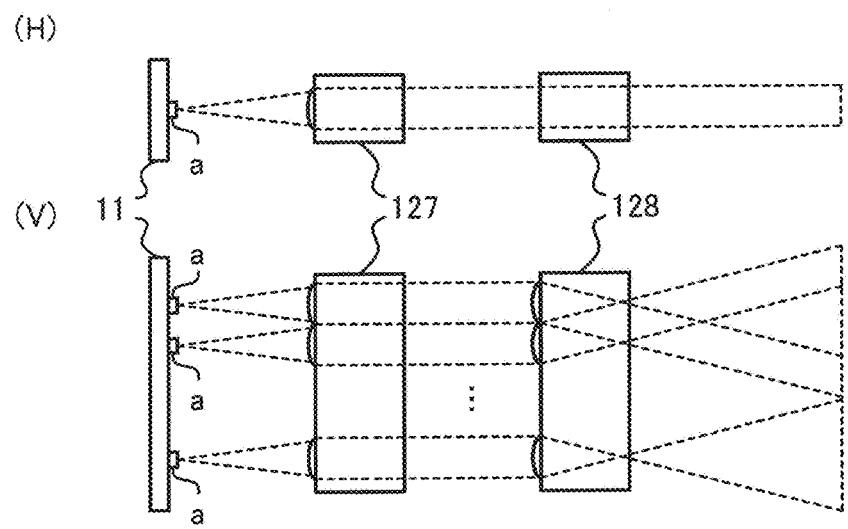
FIG. 17 is a view illustrating still further example of the optical system of the optical device.

FIG. 17 is a view illustrating still further example of the optical system of the optical device 10. In FIG. 17, in order to control the divergence angle of each light emitting element a of the VCSEL array 11, a microlens array 127 and a micro cylindrical lens array 128 are disposed in front of the VCSEL array 11 (in an optical axis direction). The configuration behind the micro cylindrical lens array 128 is omitted. The divergence angle of each light emitting element a is controlled by at least one of a microlens array and a micro cylindrical lens array. That is, the microlens array or the micro cylindrical lens array may be used to control the divergence angle of each light emitting element a. Alternatively, both of the microlens array and the micro cylindrical lens array may be used in combination. An example of combining the microlens array and the micro cylindrical lens array is illustrated.

Each lens of the microlens array 127 is spherical and converts light diverging from each light emitting element a of the VCSEL array 11 into a parallel light beam or a substantially parallel light beam in the horizontal direction (H) and the vertical direction (V). A light beam emitted from the microlens array 127 forms the length of line light in the longitudinal direction illustrated in the vertical direction (V) by the micro cylindrical lens array 128. With this configuration, the divergence angle of the VCSEL array 11 is controlled. While the light emitting elements a are arranged in one row in the horizontal direction in FIG. 17, the light emitting elements a may be arranged in the horizontal direction so that the light emitting elements a are arranged in a matrix on the VCSEL array. The microlens array and the micro cylindrical lens array may also be formed in a matrix accordingly.

The light deflection element 13 is a movable mirror capable of scanning laser light in a uniaxial or biaxial direction. Examples of the movable mirror include a MEMS mirror, a polygon mirror, and a galvano mirror. However, any movable mirrors with other systems may be used as long as the movable mirrors are capable of scanning laser light in the uniaxial or biaxial direction. In this example, a movable mirror that uniaxially scans the line light 14 formed by the line generator 12 over the measurement target 15 in the scanning range. As the movable mirror scans line light, a two-dimensional projection pattern is formed.

Figure 18:
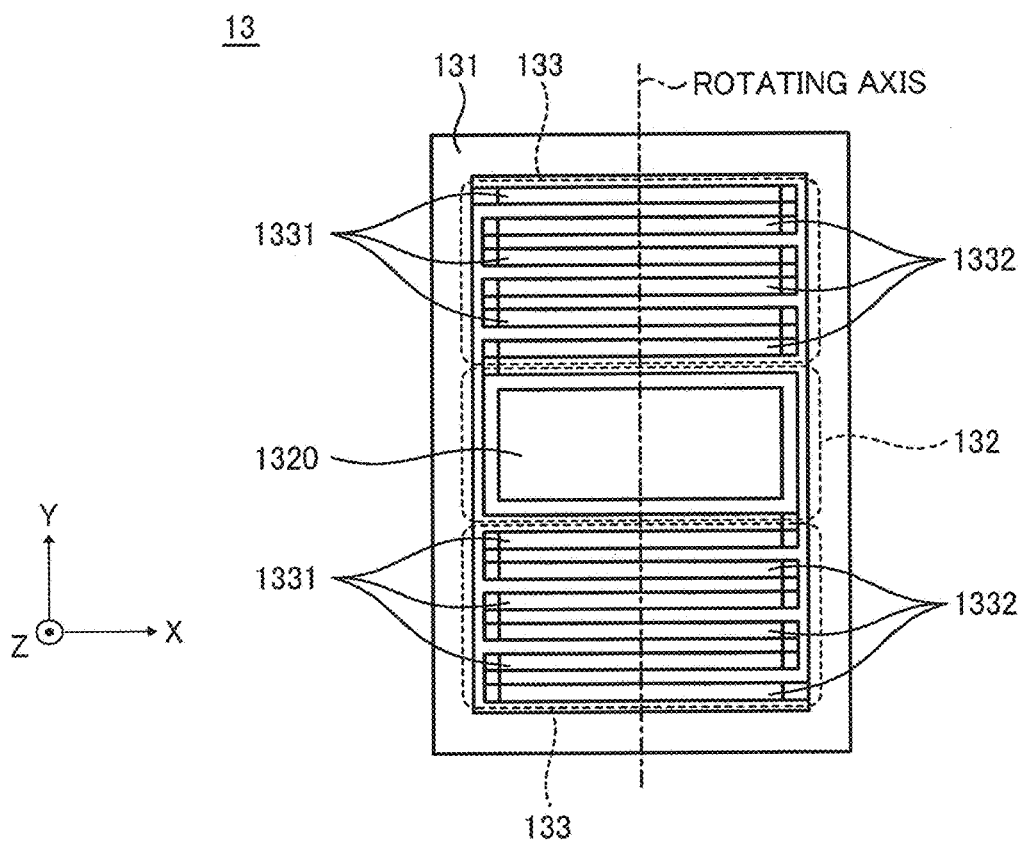
FIG. 18 is a view illustrating an example of a configuration of a MEMS mirror that is an example of the light deflection element.

FIG. 18 is a view illustrating an example of a configuration of a MEMS mirror (also referred to as "MEMS mirror scanner") that is an example of the light deflection element 13. The MEMS mirror scanner illustrated in FIG. 18 includes a movable part 132 and two meandering beam parts 133 on a support substrate 131.

The movable part 132 includes a reflection mirror 1320. One end of each of the two meandering beam parts 133 is coupled to the movable part 132 and the other end is supported by the support substrate 131. Each of the two meandering beam parts 133 is constituted by a plurality of meander-shaped beam parts, and includes a first piezoelectric member 1331 deformed by application of a first voltage and a second piezoelectric member 1332 deformed by application of a second voltage alternately. The first piezoelectric member 1331 and the second piezoelectric member 1332 that are adjacent to each other are disposed independently. The two meandering beam parts 133 are deformed by applying voltages to the first piezoelectric member 1331 and the second piezoelectric member 1332 respectively, thus rotating the reflection mirror 1320 of the movable part 132 around its rotating axis.

Specifically, voltages of opposite phases are applied respectively to the first piezoelectric member 1331 and the second piezoelectric member 1332 to warp the beam parts. Adjacent beam parts are thus bent in different directions and such an action is accumulated. The reflection mirror 1320 thus reciprocates about the rotating axis together with the movable part 132 coupled to the two meandering beam parts 133. In addition, as a sine wave with a drive frequency according to a mirror resonance mode in which the rotating axis is the rotation center is applied in opposite phase to the first piezoelectric member 1331 and the second piezoelectric member 1332, it is possible to achieve a very large rotation angle with low voltage.

The drive waveform is not limited to the sine wave. For example, a sawtooth shaped wave may be used. Not only the resonant mode but also a non-resonant mode may be used for driving.

Figure 19:
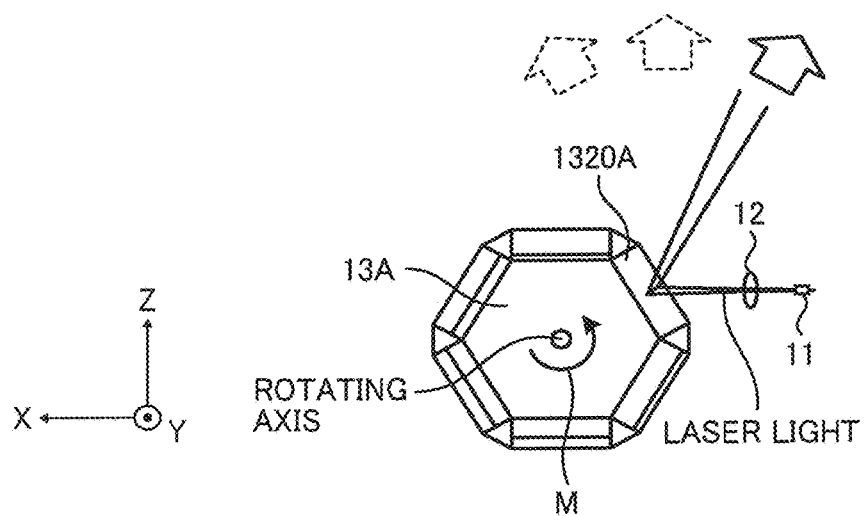
FIG. 19 is a view illustrating an example of a configuration of a polygon mirror that is an example of the light deflection element.

FIG. 19 is a view illustrating an example of a configuration of a polygon mirror that is an example of the light deflection element 13. The polygon mirror illustrated in FIG. 19 includes a plurality of plane mirrors 1320A on a rotating body 13A that rotates around a rotating axis illustrated in FIG. 19 at a constant speed in an M direction. A measurement target is uniaxially scanned with line light input from the line generator 12 to the plane mirror 1320A due to a change in the angle of the plane mirror 1320A. As indicated by arrows in FIG. 19, the polygon mirror is capable of performing measurement over a wide area in a horizontal direction (a direction perpendicular to the Y axis).

In the configuration illustrated in FIG. 19, tilt angles of the respective mirror surfaces 1320A of the polygon mirror with respect to the rotating axis are made different from each other. As described above, when the tilt angles of the respective mirror surfaces 1320A are different from each other, the output angle of line light in the vertical direction is controlled. Consequently, the output angle in the vertical direction changes each time the mirror surface 1320A changes due to the rotation of the rotating body 13A. As different tilt angles are given to the mirror surfaces 1320A, the scanning area in the vertical direction can be widened according to the number of light emitting surfaces on the polygon mirror.

Figure 20:
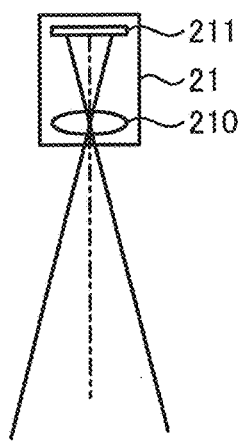
FIG. 20 is a view illustrating an example of a configuration of a camera.

FIG. 20 is a view illustrating an example of a configuration of the camera 21. The camera 21 includes the lens 210 and the image sensor 211. For example, a CCD or CMOS image sensor is used as the image sensor 211. Light incident on the camera 21 forms an image on the image sensor 211 through the lens 210 and is photoelectrically converted. An electric signal photoelectrically converted by the image sensor 211 is converted into an image signal, and the image signal is output from the camera 21 to the calculation processing unit 32 (see FIG. 6) of the control unit 30 (see FIG. 6).

In addition, a filter that transmits only the wavelength near the oscillation wavelength of the laser light source before light is incident on the lens 210 may be provided. As a result, for light incident on the lens 210, wavelengths other than the wavelength near the oscillation wavelength of the VCSEL array 11 (see FIG. 6) are cut and the S/N ratio is improved.

(Description of Functional Blocks in Controller)

Figure 21:
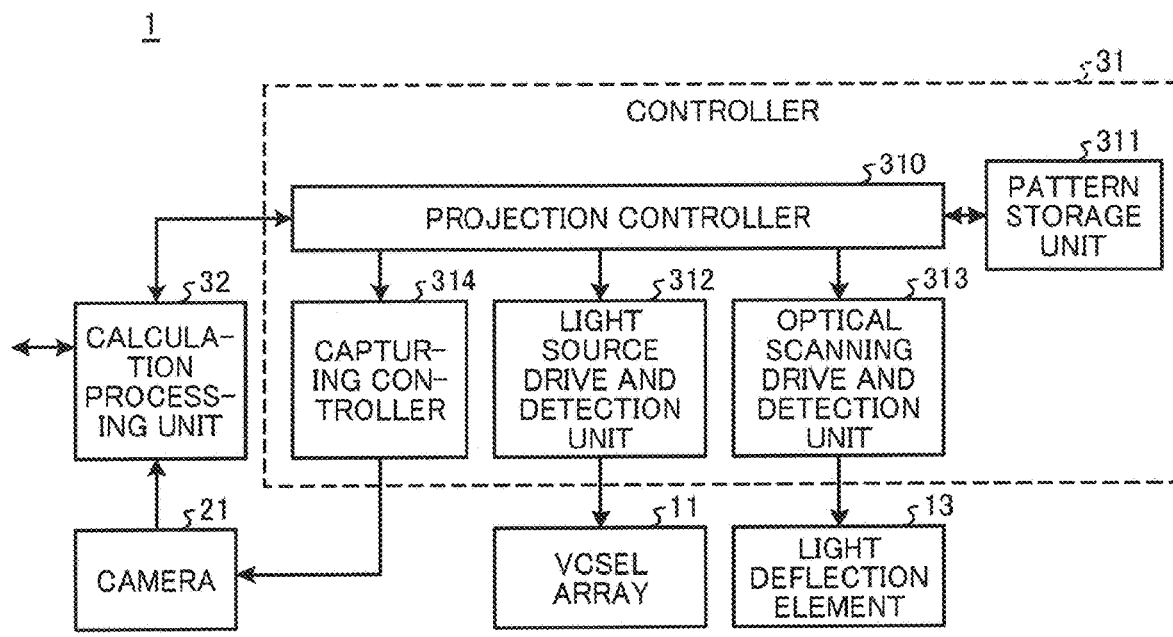
FIG. 21 is a diagram illustrating an example of a block configuration of the measurement device.

FIG. 21 is a diagram illustrating an example of a block configuration of the measurement device 1. In FIG. 21, the same reference numerals are given to the parts that have already been described, and a detailed description thereof will be appropriately omitted.

The calculation processing unit 32 illustrated in FIG. 21 analyzes an image signal output from the camera 21. The calculation processing unit 32 performs a calculation process using a result of analysis of the image signal and calibration information to perform a process of restoring three-dimensional information, thus three-dimensionally measuring a target. The calculation processing unit 32 supplies the restored three-dimensional information to the controller 31.

The controller 31 includes a projection controller 310, a pattern storage unit 311, a light source drive and detection unit 312, an optical scanning drive and detection unit 313, and a capturing controller 314.

The optical scanning drive and detection unit 313 drives the light deflection element 13 according to control of the projection controller 310. The projection controller 310 controls the optical scanning drive and detection unit 313 so that the measurement target is scanned with line light emitted to the deflection center of the light deflection element 13. The capturing controller 314 controls the capturing timing and exposure amount of the camera 21 according to the control of the projection controller 310.

The light source drive and detection unit 312 controls turning on and off of each light emitting element of the VCSEL array 11 according to the control of the projection controller 310.

The pattern storage unit 311 reads, for example, pattern information of a projection image stored in a non-volatile storage medium of the measurement device 1. The pattern information is pattern information for forming a projection image (a projection pattern). The pattern storage unit 311 reads the pattern information in response to an instruction from the projection controller 310 and passes the pattern information to the projection controller 310. The projection controller 310 controls the light source drive and detection unit 312 based on the pattern information passed from the pattern storage unit 311.

The projection controller 310 may instruct the pattern storage unit 311 to read the pattern information based on the restored three-dimensional information supplied from the calculation processing unit 32, or may instruct the calculation processing unit 32 about a calculation method according to the read pattern information.

The calculation processing unit 32, the projection controller 310, and the capturing controller 314 are implemented by a measurement program operating on a central processing unit (CPU). Specifically, the CPU reads the measurement program from a read only memory (ROM) and executes the program, thus implementing the calculation processing unit 32, the projection controller 310, and the capturing controller 314. This implementation method is an example and the present disclosure is not limited to this implementation method. For example, all or part of the calculation processing unit 32, the projection controller 310, and the capturing controller 314 may be configured by hardware circuits that operate in cooperation with each other. Further, in addition to the calculation processing unit 32, the projection controller 310, and the capturing controller 314, other blocks may be implemented by the measurement program.

(Projection Pattern)

Next, the projection pattern for scanning a measurement target will be described. There are several methods of performing three-dimensional measurement that acquires the shape and orientation of a measurement target as three-dimensional information by observing light emitted to the measurement target. Two examples, that is, (1) measurement using a phase shift method and (2) measurement using a light-section method will be described. These measurement methods are disclosed in the following Non-Patent Literatures, for example.

(1) Precision Improvement Method for Phase Shifting Based Projector-Camera Stereo System Using Response Function "Meeting on Image Recognition and Understanding (MIRU 2009)" July 2009.

(2) "Three Dimensional Visual Inspection Technology Based on Light-Section Method" RICOH TECHNICAL REPORT, No. 39, 2013, issued on Jan. 28, 2014.

Figure 22A:
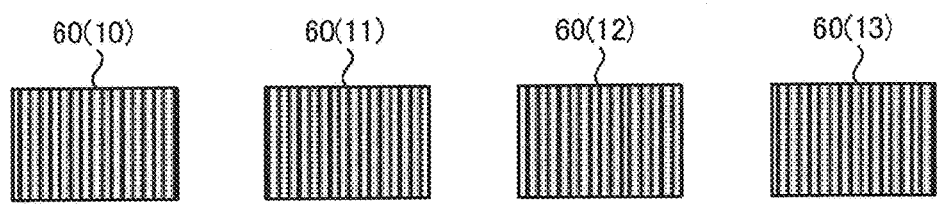
FIGS. 22A and 22B are illustrations for explaining measurement using a phase shift method.
Figure 22B:
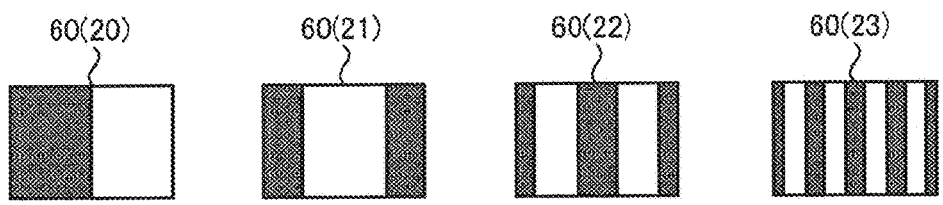

(1) The measurement using a phase shift method will be schematically described first. In the phase shift method, phase analysis is performed using a plurality of projection patterns 60(10), 60(11), 60(12), and 60(13) that are phase shift patterns of different phases as illustrated in FIG. 22A, so that the three-dimensional shape and orientation are reproduced. In this case, a structured light coding method using a plurality of projection patterns 60(20), 60(21), 60(22), and 60(23) that are different gray code patterns as illustrated in FIG. 22B is also used. By performing phase unwrapping based on the results of the structured light coding method and the phase shift method, the three-dimensional shape and orientation can be reproduced with high accuracy.

As described above, in (1) the measurement using a phase shift method, capturing is performed on each of the projection patterns 60(10) to 60(13) and 60(20) to 60(23).

Figure 23:
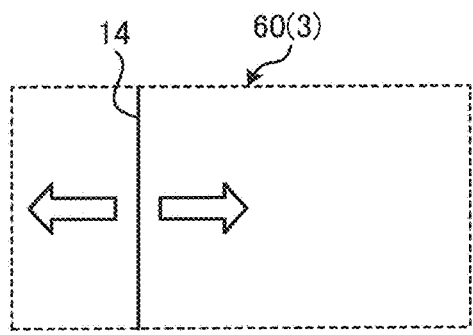
FIG. 23 is an explanatory view of measurement using a light-section method.

Next, (2) the measurement using a light-section method will be schematically described. In the light-section method, a bright line is emitted from a line light source to a measurement target. The measurement target irradiated with the bright line is then captured to obtain a bright line image. For example, as illustrated in FIG. 23, the line light (the bright line) 14 is formed from a light deflection element. Based on this bright line image, the three-dimensional shape of one line of the measurement target is generated. As illustrated in a projection pattern 60(3) of FIG. 23, the irradiation position of the line light 14 is changed by the light deflection element in direction of arrows, so that a plurality of bright line images for the measurement target are obtained. The whole three-dimensional shape of the measurement target can thus be generated. The light-section method using a light-section pattern is suitable for use in measurement of a glossy measurement target.

In the present example, each setting of a measurement device is "setting of achieving a speckle noise reduction effect". For this reason, a speckle noise is reduced in an image obtained by capturing a measurement target, and the measurement accuracy when analyzing brightness information of the captured image is improved.

Figure 24A:
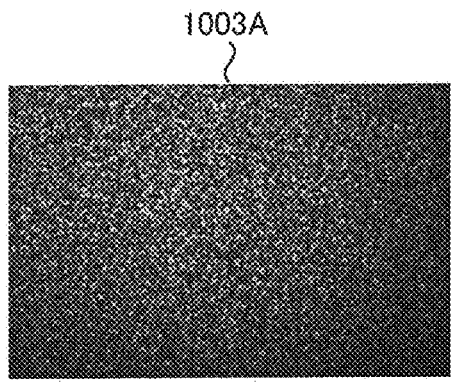
FIGS. 24A and 24B are illustrations for explaining a speckle noise reduction effect.
Figure 24B:
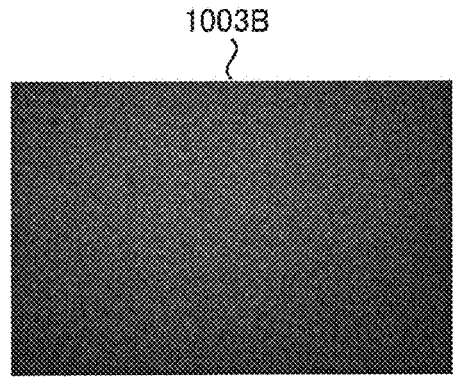

FIG. 24 is an explanatory view of a speckle noise reduction effect. FIG. 24 illustrates a captured image 1003A obtained when a white light diffusion plate is irradiated with coherent light from a single light emitting element. FIG. 24 also illustrates, as an example of the captured image acquired by the present example, a captured image 1003B obtained when the same white diffusion plate is irradiated with coherent light from 100 light emitting elements with "setting of achieving a speckle noise reduction effect". Capturing conditions for the respective captured images 1003A and 1003B are the same except for the number of light emitting elements. Specifically, the difference between the captured images is the difference between a case where only one channel emits light and a case where all channels emit light in the VCSEL array in which 100 light emitting elements are arranged.

As illustrated in the captured image 1003A of FIG. 24, only one speckle pattern is formed by light emission of one channel. The speckle pattern thus appears in the image as a speckle noise and is observed as a brightness variation. On the other hand, 100 speckle patterns are formed by light emission of 100 channels in the captured image 1003B and these speckle patterns overlap with each other, so that the speckle noise is averaged. The speckle noise is thus reduced in the image and the brightness variation is also reduced as illustrated in the captured image 1003B.

As described above, in the present example, each component of the measurement device is designed to achieve the speckle reduction effect as described above. Specifically, in the present example, the optical system of a line generator and the VCSEL light source pitch are designed so that the light source pitch of virtual line light is a pitch that achieves the effect of the angular/wavelength diversity of multiple light sources. The spread angles of line light in the longitudinal direction and in the widthwise direction are also designed by the optical system of the line generator.

Second Embodiment

Next, a second embodiment will be described. The second embodiment describes an example of using the measurement device 1 according to the first embodiment with a robot arm (an articulated arm).

Figure 25:
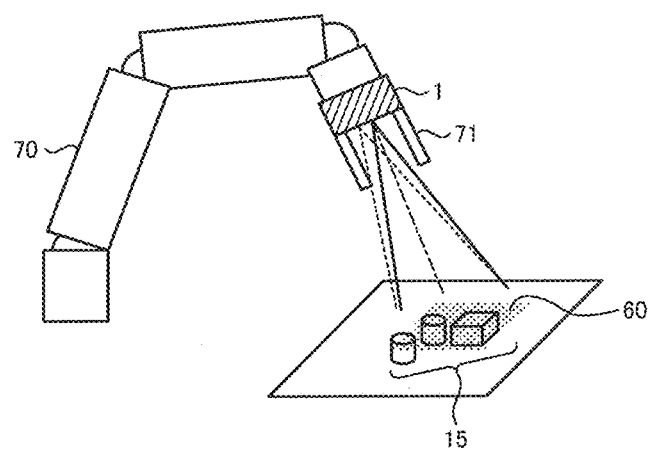
FIG. 25 is a view illustrating an example of a configuration of a robot according to a second embodiment.

FIG. 25 is a view illustrating an example of a configuration of a robot according to the second embodiment. FIG. 25 illustrates an example of using the measurement device 1 for a robot arm having multiple joints. A robot arm 70 includes a hand 71 for picking a target, and the measurement device 1 is mounted near the hand 71. The robot arm 70 includes a plurality of bendable movable parts and changes the position and orientation of the hand 71 according to control.

The measurement device 1 is disposed so that the projection direction of light is aligned with the orientation of the hand 71, and measures a picking target 15 of the hand 71 as a measurement target.

As described above, as the measurement device 1 is mounted on the robot arm 70 in the second embodiment, it is possible to measure the picking target at a short distance and improve the measurement accuracy and recognition accuracy as compared to measurement at a far distance using a camera or the like. For example, in the factory automation (FA) field in various assembly lines of factories, a robot such as the robot arm 70 is used to inspect or recognize parts. By mounting the measurement device 1 on the robot, inspection and recognition of the parts can be performed with high accuracy.

Third Embodiment

Next, a third embodiment will be described. The third embodiment describes an example of mounting the measurement device 1 according to the first embodiment on an electronic apparatus such as a smartphone and a PC.

Figure 26:
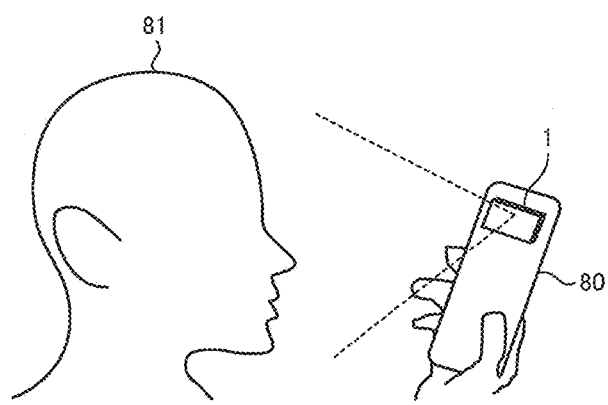
FIG. 26 is a view illustrating an example of a configuration of an electronic device such as a smartphone according to a third embodiment.

FIG. 26 is a view illustrating an example of a configuration of an electronic device such as a smartphone according to the third embodiment. FIG. 26 illustrates an example of using the measurement device 1 for a smartphone 80. The smartphone 80 includes the measurement device 1 and a user authentication function. The user authentication function is installed, for example, by providing dedicated hardware. Alternatively, this function may be achieved by a CPU having a computer configuration executing a program in a ROM or the like. The measurement device 1 measures the shape of a face, ears and a head of a user 81. Based on the measurement result, the user authentication function determines whether the user 81 is a person registered in the smartphone 80.

As described above, as the measurement device 1 is mounted on the smartphone 80 in the third embodiment, it is possible to measure the shape of the face, ears and head of the user 81 with high accuracy and improve recognition accuracy. While the measurement device 1 is mounted on the smartphone 80 in this example, the measurement device 1 may be mounted on an electronic apparatus such as a PC and a printer. Further, the function is not limited to the user authentication function, and may be used for a face scanner.

Fourth Embodiment

Next, a fourth embodiment will be described. The fourth embodiment describes an example of mounting the measurement device 1 according to the first embodiment on a mobile object.

Figure 27:
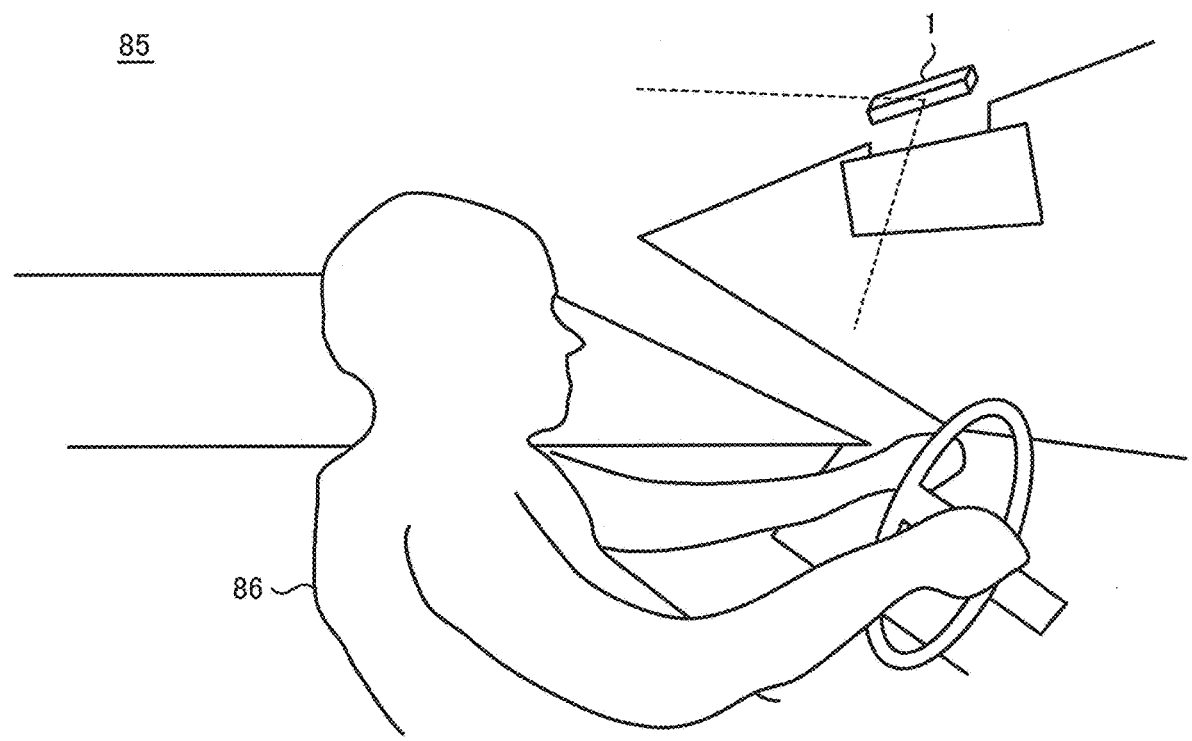
FIG. 27 is a view illustrating an example of a configuration of a vehicle according to a fourth embodiment.

FIG. 27 is a view illustrating an example of a configuration of a vehicle according to the fourth embodiment. FIG. 27 illustrates an example of using the measurement device 1 for an automobile. The measurement device 1 and a driving assist function are mounted in a compartment 85 of an automobile. The driving assist function is installed, for example, by providing dedicated hardware. Alternatively, this function may be achieved by a CPU having a computer configuration executing a program in a ROM or the like. The measurement device 1 measures a face and a posture of a driver 86. Based on the measurement result, the driving assists function performs appropriate assistance according to the state of the driver 86.

As described above, as the measurement device 1 is mounted on an automobile in the fourth embodiment, it is possible to measure the face and posture of the driver 86 with high accuracy and improve accuracy of recognition of the state of the driver 86 in the compartment 85. While the measurement device 1 is mounted on an automobile in the present example, the measurement device 1 may be mounted on a train car or a cockpit (or a passenger seat) of an airplane. Further, the function is not limited to recognition of the state of the driver 86 such as the face and posture of the driver 86, and may be used to recognize the state of passengers other than the driver 86 and the state of the compartment 85. Alternatively, the function may be used for automobile security, for example, used to authenticate the driver 86 and determine whether the driver 86 is a person who is registered as the driver of the automobile in advance.

Figure 28:
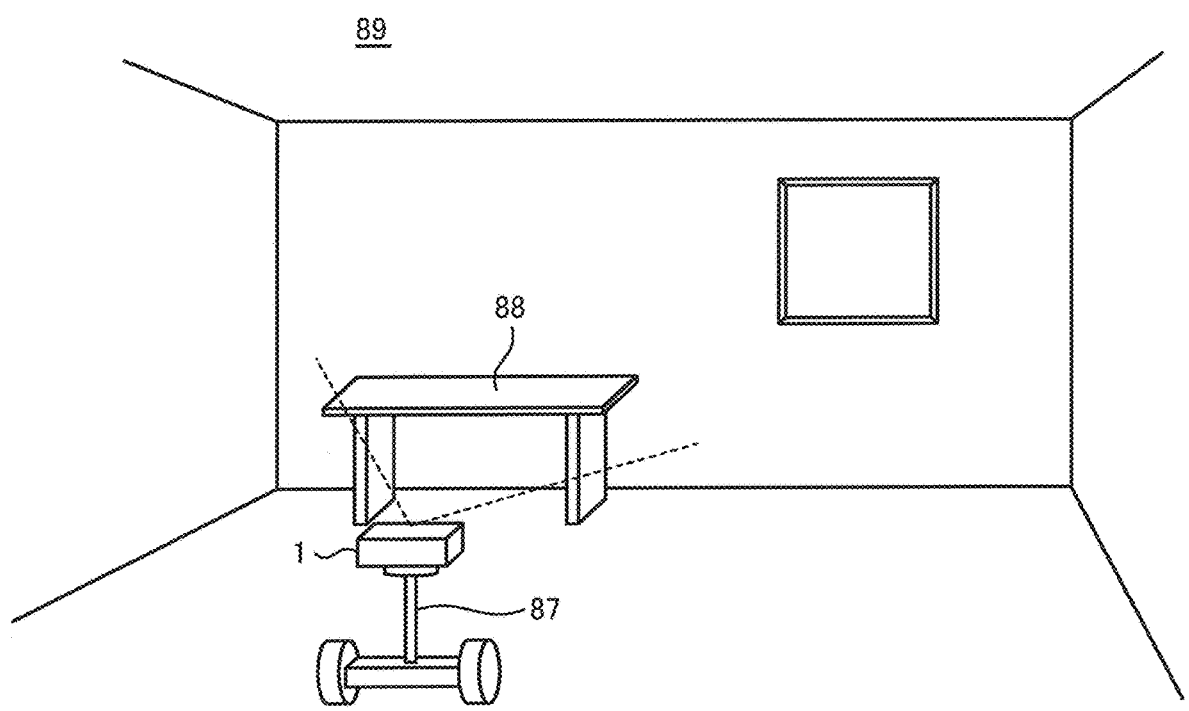
FIG. 28 is a view illustrating an example of a configuration of another mobile object according to the fourth embodiment.

FIG. 28 is a view illustrating an example of a configuration of another mobile object according to the fourth embodiment. FIG. 28 illustrates an example of using the measurement device 1 for an autonomous mobile object. The measurement device 1 is mounted on a mobile object 87 and measures the surroundings of the mobile object 87. Based on the measurement result, the mobile object 87 determines the movement path of the mobile object 87 and calculates the layout of interior 89, such as the position of a desk 88.

As described above, as the measurement device 1 is mounted on the mobile object 87 in the fourth embodiment, it is possible to measure the surroundings of the mobile object 87 with high accuracy and assist the driving of the mobile object 87. While the measurement device 1 is mounted on the compact mobile object 87 in the present example, the measurement device 1 may be mounted on an automobile or the like. Moreover, the measurement device 1 may be used not only indoor but also outdoor for the purpose of measuring buildings.

Fifth Embodiment

Next, a fifth embodiment will be described. The fifth embodiment describes an example of using the measurement device 1 according to the first embodiment, with the measurement device 1 mounted on a shaping device.

Figure 29:
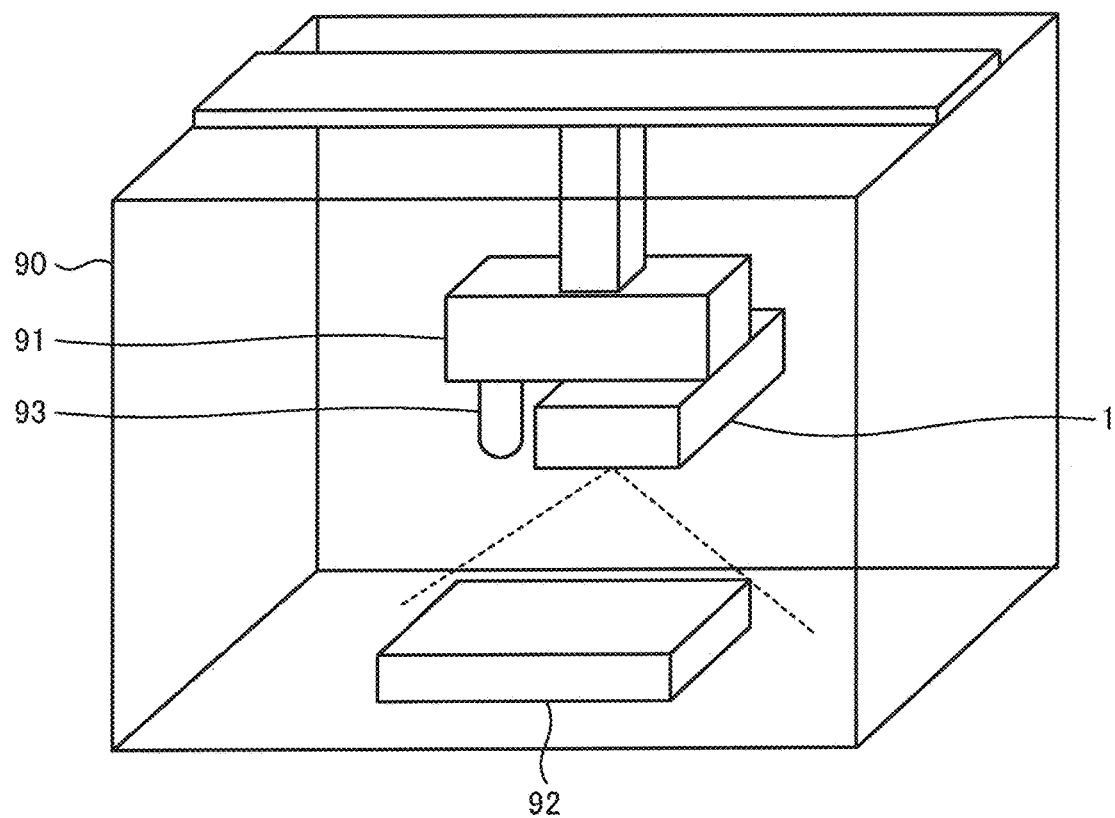
FIG. 29 is a view illustrating an example of a configuration of a 3D printer according to a fifth embodiment.

FIG. 29 is a view illustrating an example of a configuration of a shaping device according to the fifth embodiment. FIG. 29 illustrates an example of mounting the measurement device 1 on a head 91 of a 3D printer 90 that is an example of the shaping device. The head 91 includes a nozzle 93 that discharges a shaping liquid for forming a product 92. The measurement device 1 measures the shape of the product 92 formed by the 3D printer 90, during forming. Based on this measurement result, formation control for the 3D printer 90 is conducted.

As described above, as the measurement device 1 is mounted on the 3D printer 90 in the fifth embodiment, it is possible to measure the shape of the product 92 during forming and form the product 92 with high accuracy. While the measurement device 1 is mounted on the head 91 of the 3D printer 90 in this example, the measurement device 1 may be mounted on other positions in the 3D printer 90.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. An optical device comprising:
   a light source in which a plurality of light emitters are arranged at a first interval;
   an optical structure to convert light beams from the plurality of light emitters, into line light beams; and
   a light deflector to deflect each of the line light beams,
   wherein each of the line light beams is caused to be incident on the light deflector such that a longitudinal direction of each of the light beams is aligned with a direction of a rotating axis of the light deflector, and
   the optical structure focuses the line light beams in the longitudinal direction on or near the light deflector, and causes the line light beams to be incident on the light deflector at a second interval.

2. The optical device according to claim 1, wherein the line light beams overlap with each other into a substantially one light beam on an irradiated surface.

3. The optical device according to claim 1, wherein the second interval between the line light beams is such that at least one second interval is different from another second interval.

4. The optical device according to claim 3, wherein the first interval between the plurality of light emitting elements is greater than or equal to the second interval between the line light beams incident on the light deflector element.

5. The optical device according to claim 3,
wherein the second interval between the line light beams incident on the light deflector is greater than the first interval between the plurality of light emitters, and
the second interval between the line light beams incident on the light deflector is greater than or equal to 35 μm.

6. The optical device according to claim 1, wherein the first interval (D) is determined by a distance (LWD) to an irradiated surface and an incident angle (θ) of the light source, and satisfies D=2×LWD×tan(θ/2).

7. The optical device according to claim 1, wherein, with respect to a longitudinal direction and a widthwise direction of a line light beam on an irradiated surface, a width of the line light beam incident on the light deflector is longer in the widthwise direction than in the longitudinal direction.

8. The optical device according to claim 1, wherein a mirror surface of the light deflector is sized so that a side of the mirror surface corresponding to a widthwise direction of each line light beam on an irradiated surface incident on the mirror surface is longer than a side of the mirror surface corresponding to a longitudinal direction of the line light beam.

9. The optical device according to claim 1, further comprising at least one of a microlens array and a micro cylindrical lens array to control a divergence angle of each of the plurality of light emitters.

10. The optical device according to claim 1, wherein the light source is a VCSEL.

11. The optical device according to claim 1, wherein wavelengths of at least some of the plurality of light emitters are different from each other.

12. The optical device according to claim 11, wherein the plurality of light emitters include a plurality of light emitters with a same wavelength.

13. The optical device according to claim 12, wherein among the plurality of light emitters, an interval between light emitters with different wavelengths is narrower than an interval between light emitters with the same wavelength.

14. The optical device according to claim 13, wherein light emitters with the respective wavelengths are arranged at an equal interval.

15. A measurement device comprising:
the optical device according to claim 1;
a capturer to capture the line light beam on an irradiated surface; and
a measurement structure to measure a target on the irradiated surface based on image information of the line light beam captured by the capturer.

16. A robot comprising:
the measurement device according to claim 15; and
an articulated robot arm on which the measurement device is mounted.

17. An electronic apparatus comprising:
the measurement device according to claim 15; and
an authenticator to authenticate a user based on a result of measuring the user by the measurement device.

18. A mobile object comprising:
the measurement device according to claim 15; and
a driving assistor to assist driving of the mobile object based on a measurement result by the measurement device.

19. A shaping device comprising:
the measurement device according to claim 15; and
a head to form a product based on a measurement result by the measurement device.

\* \* \* \* \*